United States Patent [19]

Yazawa

[11] Patent Number: 5,524,045
[45] Date of Patent: Jun. 4, 1996

[54] CORDLESS TELEPHONE TERMINAL CONTROLLING SYSTEM

[75] Inventor: Shigehiko Yazawa, Kawasaki, Japan

[73] Assignee: Fujitsu Limited, Kanagawa, Japan

[21] Appl. No.: 305,154

[22] Filed: Sep. 13, 1994

[30] Foreign Application Priority Data

Mar. 10, 1994 [JP] Japan .................................. 6-039613

[51] Int. Cl.⁶ .............................. H04Q 7/26; H04Q 7/20
[52] U.S. Cl. ................................................. 379/58; 379/61
[58] Field of Search .................................. 370/94.1, 95.1; 379/56, 58, 59, 60, 61, 62; 455/33.1, 54.1, 56.1

[56] References Cited

U.S. PATENT DOCUMENTS

| | | | |
|---|---|---|---|
| 5,010,565 | 4/1991 | Nash et al. ................................. | 379/61 |
| 5,133,001 | 7/1992 | Böhm ........................................ | 379/58 |
| 5,168,498 | 12/1992 | Adams et al. ......................... | 370/95.1 |
| 5,280,521 | 1/1994 | Itoh ........................................... | 379/58 |

FOREIGN PATENT DOCUMENTS 470020 3/1992 Japan .

Primary Examiner—Curtis Kuntz
Assistant Examiner—William Cumming

[57] ABSTRACT

The relationship between wire telephones and cordless terminals are registered in a memory of a PBX. At the time of calling, when a cordless terminal is taken from the wire telephone, the wire telephone transmits a call signal to the PBX and supplies the input telephone number of the called party to the PBX. The PBX executes a calling process between the PBX and the cordless terminal corresponding to the wire telephone through a cordless connecting device, thereby establishing a channel between the cordless terminal and the telephone terminal of the called party. When an incoming call is terminated, if the cordless terminal is on the wire telephone, the PBX calls the wire telephone. If the cordless terminal is lifted by the calling, the PBX executes an incoming call process between the PBX and the cordless terminal, thereby establishing a channel between the cordless terminal and the call party.

12 Claims, 20 Drawing Sheets

CORDLESS TELEPHONE TERMINAL CONTROLLING SYSTEM

BACKGROUND OF THE INVENTION

1. Field of the Invention

The present invention relates to a cordless telephone terminal controlling system and, more particularly, to a controlling system for a cordless telephone terminal which is provided with both a function of a handset of a wire telephone and a function of a multi-zone type cordless telephone terminal.

2. Description of the Related Art

There are two types of cordless telephones according to the usage thereof. One is a cordless home telephone and the other is a cordless office telephone.

The cordless home telephone is composed of a master phone (wire telephone) and a secondary phone (cordless terminal). The master phone is connected to an exchange by a wire and provided with a charging rest for receiving the secondary phone. When the secondary phone is separated from the charging rest, the master phone can transmit to and receive signals from the secondary phone on a radio wave.

Communication is possible on such a cordless home telephone by (1) lifting the handset of the master phone and inputting the telephone number of the called party by the key operation on the master phone, (2) operating a predetermined key on the master phone without lifting the handset and thereafter inputting the telephone number of the called party, (3) lifting the secondary phone from the charging rest and inputting the telephone number of the called party by the key operation on the secondary phone, or (4) operating a predetermined key on the secondary phone when it is not on the charging rest and thereafter inputting the phone number of the called party by the key operation on the secondary phone.

When an incoming call terminates at the cordless home telephone, it is possible to talk with the caller by (1) lifting the handset of the master phone, (2) lifting the secondary phone from the charging rest, or (3) operating a predetermined key on the secondary phone when it is not on the charging rest.

The multi-zone type cordless office telephone enables a person carrying the telephone to transmit and receive at any place in the office. FIG. 19 shows a structure of a conventional multi-zone type cordless telephone system. The reference numeral 1 represents a PBX (Private Branch Exchange), $2_1$, $2_2$ and $2_3$ denote cordless connecting devices, $3_1$, $3_2$ and $3_3$ cordless telephones, and $4_1$, $4_2$ and $4_3$ designate telephones (wire telephones) installed on desks.

The cordless connecting devices $2_1$, to $2_3$ transmit and receive signals to and from the cordless telephones $3_1$, $3_2$ and $3_3$ by transmitting a outgoing call signal, a incoming call signal and a speech signal on a radio wave, so that the range in which the radio wave is received is limited. For this reason, each of the cordless connecting devices $2_1$, $2_2$ and $2_3$ is installed, for example, on each of the first to third floors of a building BL so that the plurality of cordless connecting devices $2_1$, $2_2$ and $2_3$ cover the entire part of the building BL (the entire telephone service area). The range in which a radio wave from one cordless connecting device can be received is called a zone. The multi-zone type cordless telephone system is composed of a plurality of zones #1 to #3, so that transmission and reception are possible by the each of the cordless telephones $3_1$, $3_2$ and $3_3$ in any of the zones #1 to #3.

For example, in FIG. 19, the cordless telephone $3_1$ on the first floor can transmit call signal through the cordless connecting device $2_1$ installed on the first floor, and when the cordless telephone $3_1$ is carried to the third floor, it transmits call signal through the cordless connecting device $2_3$. In addition, in the multi-zone type cordless telephone system, the PBX 1 registers the position of each cordless telephone so as to know in which zone each cordless telephone is located and to make the transmission to each cordless telephone smooth. For this purpose, the PBX 1 has a telephone number-zone table TLZ in which telephone numbers are listed in correspondence with the zones in which the cordless telephones having the respective telephone numbers are located. In the state shown in FIG. 19, if an incoming call is terminated at the cordless telephone $3_3$ having a number of 3000, the PBX 1 supplies an incoming call signal only to the cordless connecting device $2_3$ on the third floor to enable smooth reception by the cordless telephone $3_3$ having a number of 3000 on the third floor.

FIG. 20 is a flowchart of the process for registering, in the PBX 1, the zone in which each cordless telephone is located.

In the multi-zone type cordless telephone system, if the PBX 1 does not seize the zone in which each cordless telephone is located, it is impossible to call the corresponding cordless telephone smoothly. For this reason, each cordless connecting device $2i$ which is not occupied by a call periodically emits a radio wave with the number of the zone (zone identifier) to which it belongs to the cordless telephones in the same zone (101 and 102). When each cordless telephone $3i$ receives the zone number from the cordless connecting device $2i$ in the zone in which the cordless telephone $3i$ exists (step 103), the cordless telephone $3i$ judges whether or not the zone number stored in its memory portion agrees with the zone number received (step 104), and if the answer is YES, the process is returned to the step 101, and the processing thereafter is repeated. If the answer is NO, it means that the cordless telephone $3i$ is moved to another zone, so that the zone number in the memory is replaced by the zone number received (step 105). In this way, each cordless telephone $3i$ constantly holds the number of the zone in which it exists in its memory portion. Thereafter, the cordless telephone $3i$ transmits a position register signal which includes the telephone number and the latest zone number to the cordless connecting device $2i$ in that zone on a radio wave (step 106). When the cordless connecting device $2i$ receives the position register signal from the cordless telephone $3i$, it supplies the signal to PBX 1 (step 107). The PBX 1 updates the telephone number-zone table TLZ in accordance with the position register signal (step 108) and waits for the next signal transmission. That is, the zone number corresponding to the telephone number received is updated with the zone number received.

To state this specifically, if the cordless telephone $3_1$ is in the zone #1, for example, the cordless telephone $3_1$ receives the zone number #1 from the cordless connecting device $2_1$ and stores it in the memory portion. In this state, if the cordless telephone $3_1$ is moved to the third floor, the cordless telephone $3_1$ receives the zone number #3 from the cordless connecting device $2_3$. Since the zone number stored in the memory portion is #1, there is discrepancy in zone number. In this case, the cordless telephone $3_1$ judges that it is moved to a different zone and updates the contents of the memory portion and simultaneously transmits a position register signal (including the telephone number 1000 and the zone number #3) to the cordless connecting device 23. When the cordless connecting device $2_3$ receives the position register signal, it transmits the signal to the PBX 1, and the PBX 1 updates the telephone number-zone table TLZ in the memory 1a so as to indicate that the cordless telephone $3_1$ having the telephone number of 1000 exists in the zone #3.

However, a conventional multi-zone type cordless telephone system is disadvantageous in that the cordless telephone cannot be used in the same way as a cordless home telephone.

In addition, in a multi-zone type cordless telephone system, the telephone number of the cordless telephone is different from the telephone number of a wire telephone installed on a desk. Therefore, the owner of a cordless telephone (1) informs callers of the telephone number of the cordless telephone in advance as well as the telephone number of the wire telephone installed on his desk, and asks the callers to call him up again on the cordless telephone when he is not at the desk, or (2) registers the telephone number of the cordless telephone to which the incoming call is to be transferred in his absence in the wire telephone on the desk and receives the transferred incoming call on the cordless telephone carried by him. Both of these methods are, however, inconvenient. In the method (1), callers must know two telephone numbers, and in the method (2), although the owner has only to tell callers the telephone number of the wire telephone on the desk, it is necessary to register the telephone number of the cordless telephone in the wire phone on the desk so that the incoming call in his absence to be transferred to the cordless telephone.

SUMMARY OF THE INVENTION

Accordingly, it is a first object of the present invention to eliminate the above-described problems in the related art and to provide a cordless telephone terminal controlling system which enables a cordless terminal (secondary phone) to be provided in correspondence with a wire telephone (master phone) so as to be utilized both (1) as a handset of the wire telephone and (2) as a multi-zone type cordless terminal.

It is a second object of the present invention to provide a cordless telephone terminal controlling system which obviates the necessity for providing a handset for a wire telephone.

It is a third object of the present invention to provide a cordless telephone terminal controlling system which enables a cordless terminal used as a handset to transmit and receive in the same way as an ordinary wire telephone.

It is a fourth object of the present invention to provide a cordless telephone terminal controlling system which enables a cordless terminal to be used in the same way as a secondary phone of a cordless home telephone.

It is a fifth object of the present invention to provide a cordless telephone terminal controlling system which does not necessarily require a radio interface in a wire telephone for transmitting and receiving a signal to and from a cordless terminal on a radio wave.

It is a sixth object of the present invention to provide a cordless telephone terminal controlling system which can automatically call a cordless terminal carried away from a wire telephone when the wire telephone receives a call.

The first to fifth objects of the present invention are achieved by a cordless telephone terminal control system comprising: wire telephones; cordless terminals provided in correspondence with the wire telephones and having both a function as a handset of a wire telephone and a function as a cordless terminal; cordless connecting devices for transmitting and receiving a signal to and from the cordless terminals on a radio wave; and a private branch exchange PBX which is connected to the wire telephones and the cordless connecting devices; wherein the private branch exchange includes a memory for registering the relationship between the wire telephones and the cordless terminals; one of the wire telephone transmits a call signal to the private branch exchange when the cordless terminal is taken from the wire telephone and then transmits connection number of a called party which is input by the key operation to the private branch exchange; the private branch exchange obtains the cordless terminal corresponding to the wire telephone which has called from the relationship stored in the memory, executes a call setting process between the private branch exchange and the cordless terminal through a predetermined cordless connecting device on the basis of the connection number input thereto, and establishes a speech channel between the cordless terminal and the telephone terminal of the called party.

The first to fifth objects of the present invention are achieved by a cordless telephone terminal control system in which the connection number of the called party which is input after the operation of the calling key provided on a cordless terminal is transmitted to a private branch exchange through a cordless connecting device, in which the private branch exchange executes a call setting process between the private branch exchange and the cordless terminal through a predetermined cordless connecting device on the basis of the input connection number, and establishes a speech channel between the cordless terminal and the telephone terminal of the called party.

The third and the sixth objects of the present invention are achieved by a cordless telephone terminal control system in which the private branch exchange includes a means for judging an on-hook/off-hook state of a wire telephone, judges whether the wire telephone is in an on-hook state or an off-hook state when an incoming call is terminated at the wire telephone, and calls the cordless terminal through a cordless connecting device if the wire telephone is in the off-hook state, while calling the wire telephone if the wire telephone is in the on-hook state.

The first to fifth objects of the present invention are achieved by a cordless telephone terminal control system comprising: a wire telephone including a wire interface for connecting the wire telephone to a private branch exchange through a wire, a wireless interface for communicating with the cordless terminal on a radio wave, a man-machine interface and a control unit for controlling these interfaces; a cordless terminal provided in correspondence with the wire telephone and having both a function as a handset of the wire telephone and a function as a cordless terminal corresponding to a multiplicity of zones; a cordless connecting device which transmits and receives a signal to and from the cordless terminal on a radio wave; and the private branch exchange PBX connected to the wire telephone and the cordless connecting device; wherein the wire telephone transmits a call signal to the private branch exchange when the cordless terminal is taken from the wire telephone and transmits connection number of a called party which is input by key operation to the private branch exchange; the cordless terminal starts to establish a wireless channel with the wire telephone when the cordless terminal assumes the noncontact state from the contact state; when the wire telephone detects the establishment of the wireless channel, the wire telephone connects the channel of the wire interface with the channel of the wireless interface; and the private branch exchange establishes a speech channel between the cordless terminal and the telephone terminal of the called party on the basis of the connection number.

Other features and advantages of the present invention will be apparent from the following description taken in conjunction with the accompanying drawings.

Figure 1:
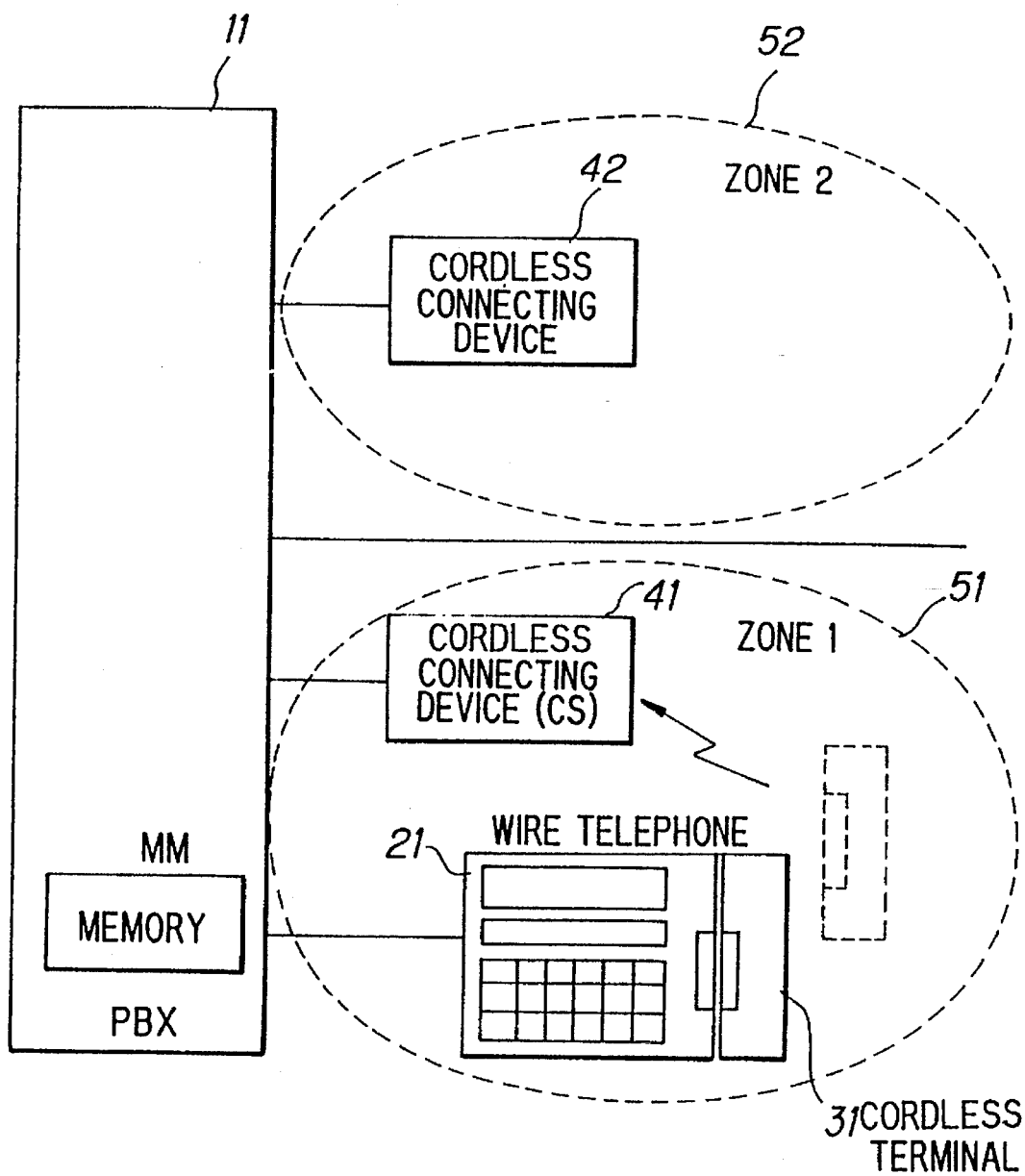
FIG. 1 schematically explains the principle of the present invention.

DESCRIPTION OF THE PREFERRED EMBODIMENTS (A) Schematic explanation of present invention FIG. 1 schematically shows the principle of the present invention.

The reference numeral 11 denotes a private branch exchange (PBX), 21 a wire telephone, 31 a cordless terminal provided in correspondence with the wire telephone 21 and having both a function as a handset of the wire telephone and a function as a cordless terminal, and 41, 42 multizone type cordless connecting devices for transmitting and receiving a signal to and from the cordless terminal 31 on a radio wave. The wire telephone 21 and the cordless connecting devices 41, 42 are connected to the PBX 11. Wireless zones 51 and 52 which are covered by the cordless connecting devices 41 and 42, respectively, constitute a multi-zone. The wire telephone 21 has a charging rest (not shown) for receiving the cordless terminal 31.

(a) When the wire telephone 21 does not have a wireless interface for the cordless terminal 31:

(a-1) The relationship between the wire telephone 21 and the cordless terminal 31 is registered in the memory MM in the private branch exchange 11. At the time of calling, if the cordless terminal 31 is taken from the wire telephone 21, the wire telephone 21 supplies a call signal to the private branch exchange 11 and transmits connection number of a called party (telephone number of a called party) which is input by the key operation of the wire telephone 21. The private branch exchange 11 executes a call setting process between the private branch exchange 11 and the cordless terminal 31 which corresponds to the wire telephone 21 through the cordless connecting device 41 on the basis of the connection number so as to establish a speech channel between the cordless terminal 31 and the telephone terminal of the called party. At the time of an incoming call, if the cordless terminal 31 is mounted on the wire telephone 21, the private branch exchange 11 calls the wire telephone 21. If the cordless terminal 31 is lifted from the wire telephone 21 when the incoming call is terminated, the private branch exchange 11 executes an incoming call process between the private branch exchange 11 and the cordless terminal 31 through the cordless connecting device 41 so as to establish a speech channel between the cordless terminal 31 and the call party. In this way, it is possible to use the cordless terminal 31 in the same way as a handset, thereby obviating the need for providing a handset for the wire telephone 21. In addition, the cordless terminal 31 can be used in the same way as a secondary phone of a cordless home telephone.

(a-2) A speaker, a microphone and a speaker key are provided for the wire telephone 21. When the speaker key is pressed down, the private branch exchange 11 changes the connection of the speech channel from the wire telephone 21 over to the cordless terminal 31 or vice versa. In this way, it is possible to communicate with the person at the other end through the wire telephone 21 with the hands free or by using the cordless terminal 31.

(a-3) It is possible to set an instruction which instructs the execution of the calling operation when the cordless terminal 31 assumes the noncontact (off-hook) state from the contact state, in the wire telephone 21 as desired. Therefore, if the instruction is not set in the wire telephone 21, the wire telephone 21 does not supply a call signal to PBX, for example, when the cordless terminal 31 is taken from the wire telephone 21 so as to be carried.

(a-4) A call key is provided in the cordless terminal 31. After operating the call key, the connection number of a called party (telephone number of a called party) is transmitted from the cordless terminal 31. The private branch exchange 11 executes a call setting process between the private branch exchange 11 and the cordless terminal 31 on the basis of the connection number through the cordless connecting device 41 so as to establish a speech channel between the cordless terminal 31 and the telephone terminal of the called party. In addition, a cut key is provided on the cordless terminal 31. When the cut key is pressed down, the private branch exchange 11 releases both the cordless terminal 31 and the wire telephone 21. In this way, the cordless terminal 31 can be used all the more in the same way as the secondary phone of a cordless home telephone.

(a-5) When an incoming call is terminated at the wire telephone 21, the private branch exchange 11 judges whether the wire telephone 21 is in the on-hook (contact) state or in the off-hook (noncontact) state. If it is in the off-hook state, the private branch exchange 11 calls the cordless terminal 31 through the cordless connecting device 41, while calling the wire telephone 21 if it is in the onhook state. In this way, if the owner of the wire telephone 21 carries the cordless terminal 31, it is possible to terminate an incoming at the cordless terminal 21 with certainty.

(b) When the wire telephone 21 has a wireless interface for the cordless terminal 31:

(b-1) At the time of calling, if the cordless terminal 31 is taken from the wire telephone 21, the wire telephone 21 supplies a call signal to the private branch exchange 11, and the cordless terminal 31 starts establishing a wireless channel with the wire telephone 21. When the wire telephone 21 detects the establishment of the wireless channel, it connects the cordless terminal 31 to the private branch exchange 11. Thereafter, when the connection number of a called party (telephone number of a called party) is input by the key operation on the wire telephone 21, the private branch exchange 11 establishes a speech channel between the cordless terminal 31 and the telephone terminal of the called party on the basis of the connection number. At the time of incoming call, if the cordless terminal 31 is mounted on the wire telephone 21, the private branch exchange 11 calls the wire telephone 21. If the cordless terminal 31 is lifted from the wire telephone 21 when the incoming call is terminated, the cordless terminal 21 starts establishing a wireless channel with the corresponding wire telephone 21. When the wire telephone 21 detects the establishment of the wireless channel, it connects the cordless terminal 31 to the private branch exchange 11. Thereafter, the private branch exchange 11 establishes a speech channel between the cordless terminal 31 and the caller party. In this way, it is possible to use the cordless terminal 31 in the same way as a handset, thereby obviating the need for providing a handset for the wire telephone 21.

(b-2) The relationship between the wire telephone 21 and the cordless terminal 31 is registered in the memory MM in the private branch exchange 11. When an incoming call is terminated at the wire telephone 21, the private branch exchange 11 judges whether or not the wire telephone 21 is in contact with the cordless terminal 31. If the wire telephone 21 is not in contact with the cordless terminal 31, the private branch exchange 11 calls the cordless terminal 31 through the predetermined cordless connecting device 41, while calling the wire telephone 21 if the wire telephone 21 is in contact with the cordless terminal 31. In this way, if the owner of the wire telephone 21 carries the cordless terminal 31, it is possible to terminate an incoming call at the cordless terminal 21 with certainty.

(B) First embodiment (a) Entire structure

Figure 2:
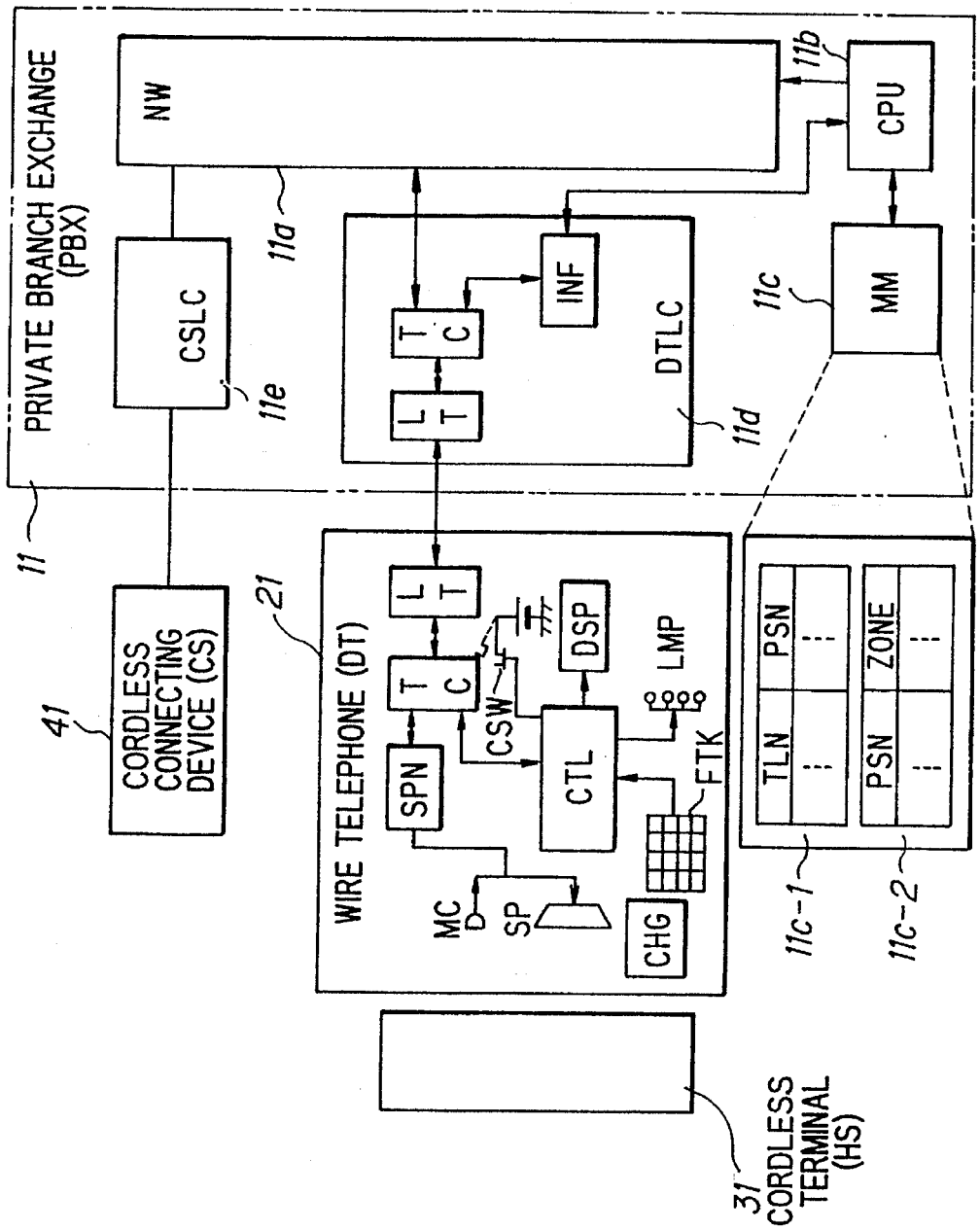
FIG. 2 shows the structure of a first embodiment of the present invention.

FIG. 2 shows the entire structure of a cordless telephone terminal control system according to the present invention.

The reference numeral 11 denotes a private branch exchange (PBX), 21 a wire telephone such as a digital telephone terminal (DT), 31 a cordless terminal (HS) provided in correspondence with the wire telephone 21 and having both a function as a handset of the wire telephone and a function as a cordless terminal, 41 a multi-zone type cordless connecting device (CS: Cell Station) for transmitting and receiving a signal to and from the cordless terminal 31 on a radio wave. The wire telephone 21 and the cordless connecting device 41 are connected to the PBX 11. Actually, a plurality of cordless connecting devices are provided and a multi-zone is constituted by a plurality of wireless zones. A multiplicity of wire telephones (DT) 21 and cordless terminals (HS) 31 are provided in each zone.

Figure 3:
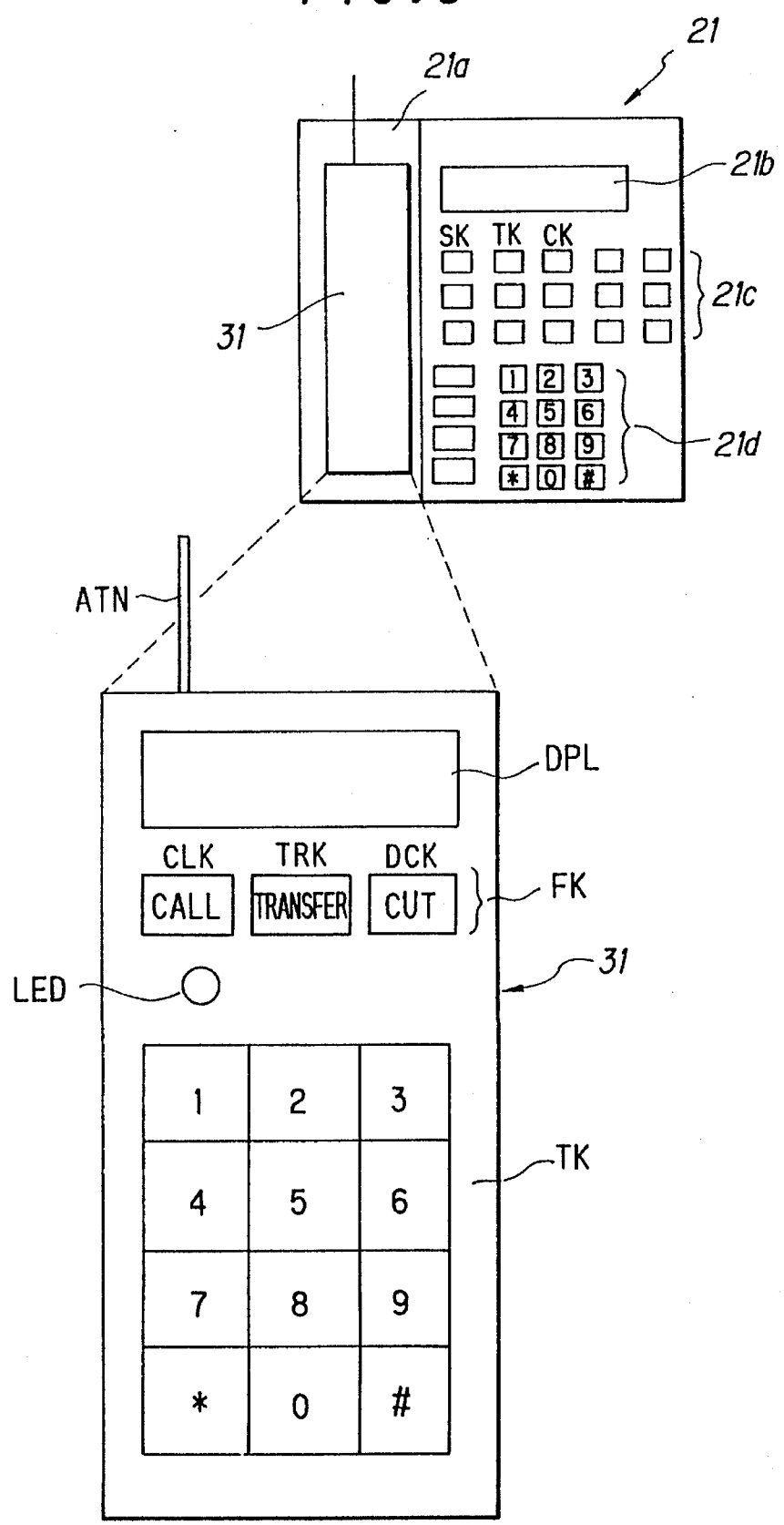
FIG. 3 is an external view of a wire telephone and a cordless terminal in the first embodiment.

The wire telephone 21 and the cordless terminal 31 have an external appearance shown in FIG. 3. The wire telephone 21 is provided with a charging rest 21a for receiving and charging the cordless terminal 31, a display portion 21b, a various function key portion 21c and a ten key portion 21d, and uses the cordless terminal 31 as a handset. Examples of the function keys are a speaker key SK for switching the wire telephone 21 and the cordless terminal 31 over to each other, a transfer key TK, and a calling operation key CK for instructing the execution of calling operation when the cordless terminal 31 is taken from the wire telephone 21 (in non-contact state).

The cordless terminal 31 is provided with a display portion DPL, a function key portion FK, a busy lamp LED, a ten key portion TK, an antenna ATN, etc. Examples of the function keys are a call key CLK operated at the time of calling or reception, a transfer key TRK, and a cut key DCK operated at the end of communication.

(b) Private branch exchange (PBX)

The PBX 11 is provided with a network circuit (NW) 11a for switching, a central processing unit (CPU) 11b, a main storage unit (MM) 11c, a subscriber circuit (DTLC) 11d for the wire telephone 21 and a subscriber circuit (CSLC) 11e for the cordless connecting device 41, as shown in FIG. 2. The subscriber circuits 11d and 11e have the same structure, and are provided with a transfer control unit TC, a line termination unit LT and an interface portion INF with respect to the central processing unit CPU.

The relationship 11c-1 between the telephone number (TLN) of the wire telephone 21 and the telephone number (PSN) of the cordless terminal 31 and the relationship 11c-2 between the cordless terminal and the zone to which the cordless terminal 31 belongs are registered in advance in the main storage unit 11c.

(c) Wire telephone

The wire telephone 21 is provided with a transfer control unit TC, a line termination circuit LT, a speech channel circuit SPN, a microphone MC, a speaker SP, a control unit CTL for controlling the entire part of the wire telephone 21, a display portion DSP (corresponding to the display portion 21b in FIG. 3), a function key and ten key portion FTK (corresponding to the function key portion 21c and the ten key portion 21d in FIG. 3), various display lamps LMP, a charging circuit CHG for charging the cordless terminal 31 and a contacting state detection switch CSW, as shown in FIG. 2. The speech channel circuit SPN has a CODEC (DA converter, AD converter), an amplifier, etc. The speech channel circuit SPN converts the speech signal from the microphone MC into a digital signal and transmits it to the line, and converts the digital speech data from the line into an analog speech signal and inputs it to the speaker SP. The contacting state detection switch CSW is turned on when the cordless terminal 31 is mounted on the charging rest 21a and is turned off when the cordless terminal 31 is taken therefrom. In other words, the contacting state detection switch CSW has a similar function to that of the hook switch of an ordinary telephone. The lamps LMP are provided in correspondence with predetermined function keys.

(d) Codeless terminal

Figure 4:
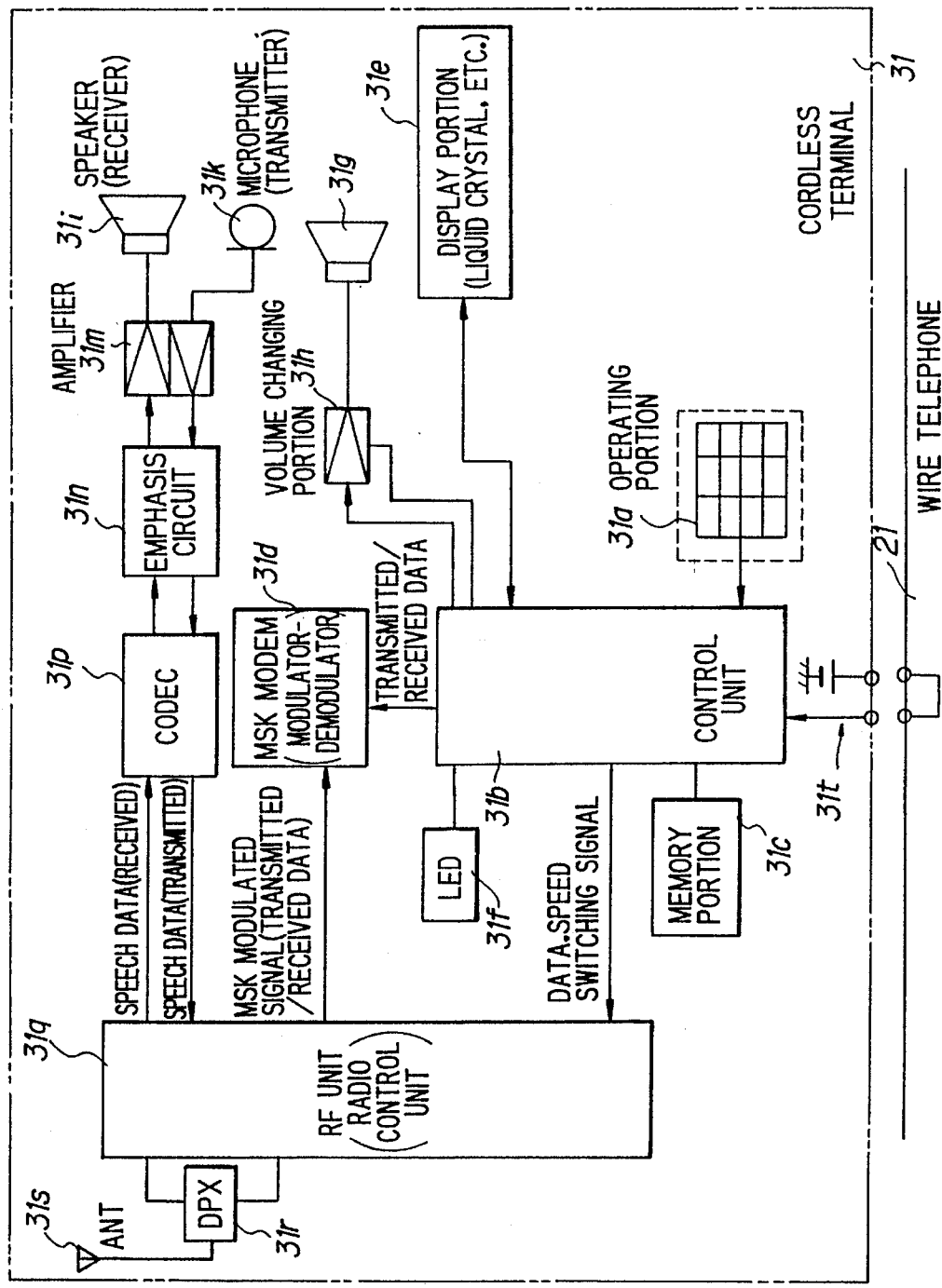
FIG. 4 shows the structure of the cordless terminal shown in FIG. 2.

FIG. 4 shows the structure of the cordless terminal 31. The reference numeral 31a represents an operating portion provided with a ten key TK and a function key FK, 31b is a control unit constituted by a microcomputer for controlling the entire part of the cordless terminal 31, 31c is a memory portion, 31d is an MSK modem (modulator-demodulator) for modulating data and transmitting it to the cordless connecting device and demodulating the data from the cordless connecting device, 31e is a display portion DPL of liquid crystal or the like for displaying the telephone number, the time, etc., 31f is a lamp for displaying various states, 31g is a speaker for outputting a call sound (ringing back tone), 31h is a volume changing portion, 31i a receiver (speaker), 31k is a transmitter (microphone), 31m an amplifier, 31n an emphasis circuit, 31p a CODEC, 31q a radio frequency unit (radio control unit), 31r is a duplexer, 31s is an antenna (ANT), and 31t is a contacting state detecting portion for detecting whether or not the cordless terminal 31 is in contact with the wire telephone 21.

(e) Cordless connecting device

Figure 5:
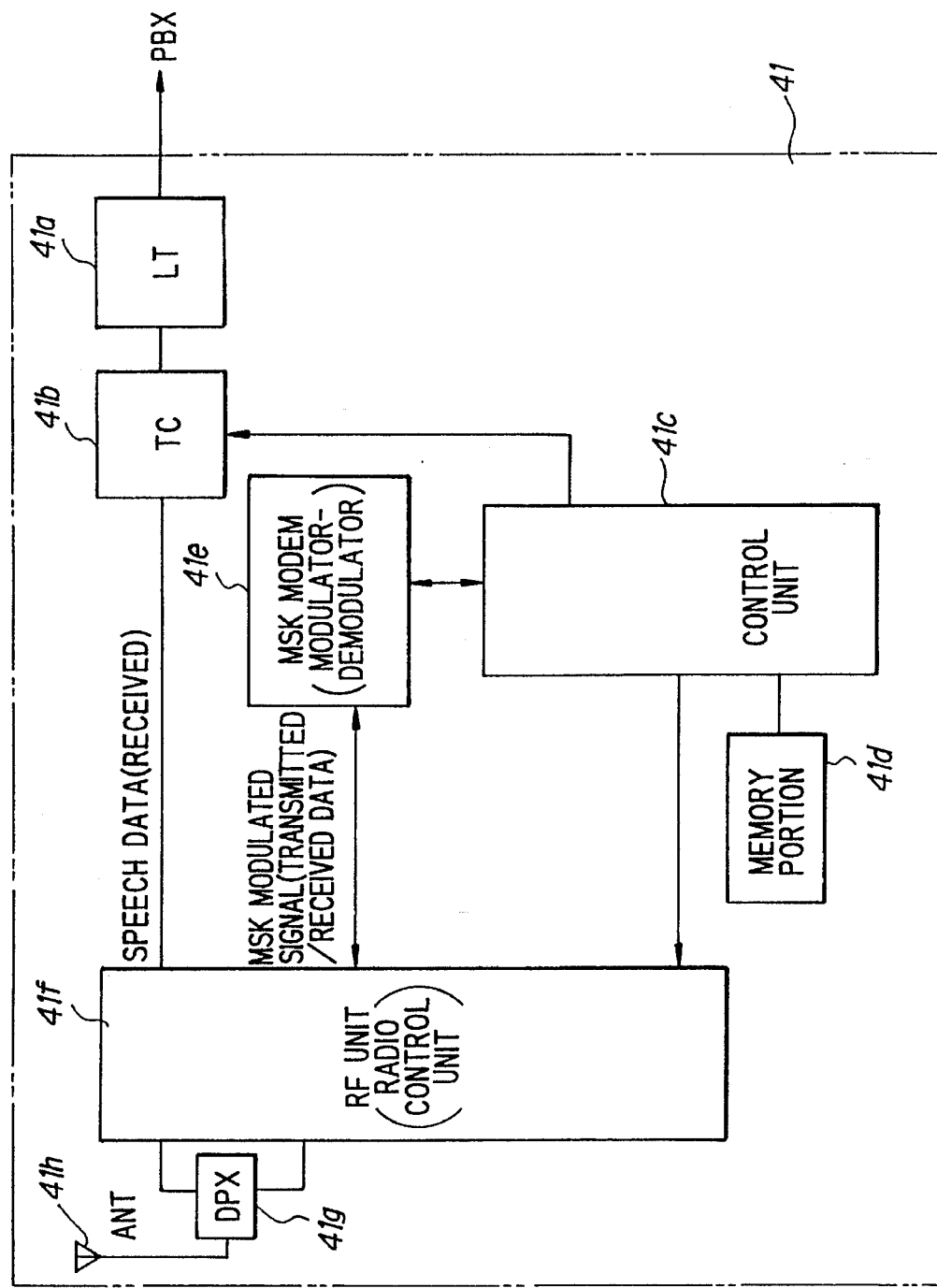
FIG. 5 shows the structure of the cordless connecting device shown in FIG. 3.

FIG. 5 shows the structure of the cordless connecting device. The reference numeral 41a represents a line termination unit (LT), 41b is a transfer control unit (TC), 41c a control unit constituted by a microcomputer for controlling the entire part of the cordless connecting device 41, 41d is a memory portion, 41e an MSK modem (modulator-demodulator) for modulating data and transmitting it to the cordless terminal and demodulating the data from the cordless terminal 31, 41f is a radio frequency unit (radio control unit), 41g is a duplexer, and 41h is an antenna (ANT).

(f) Calling process (f-1) Calling process 1

Figure 6:
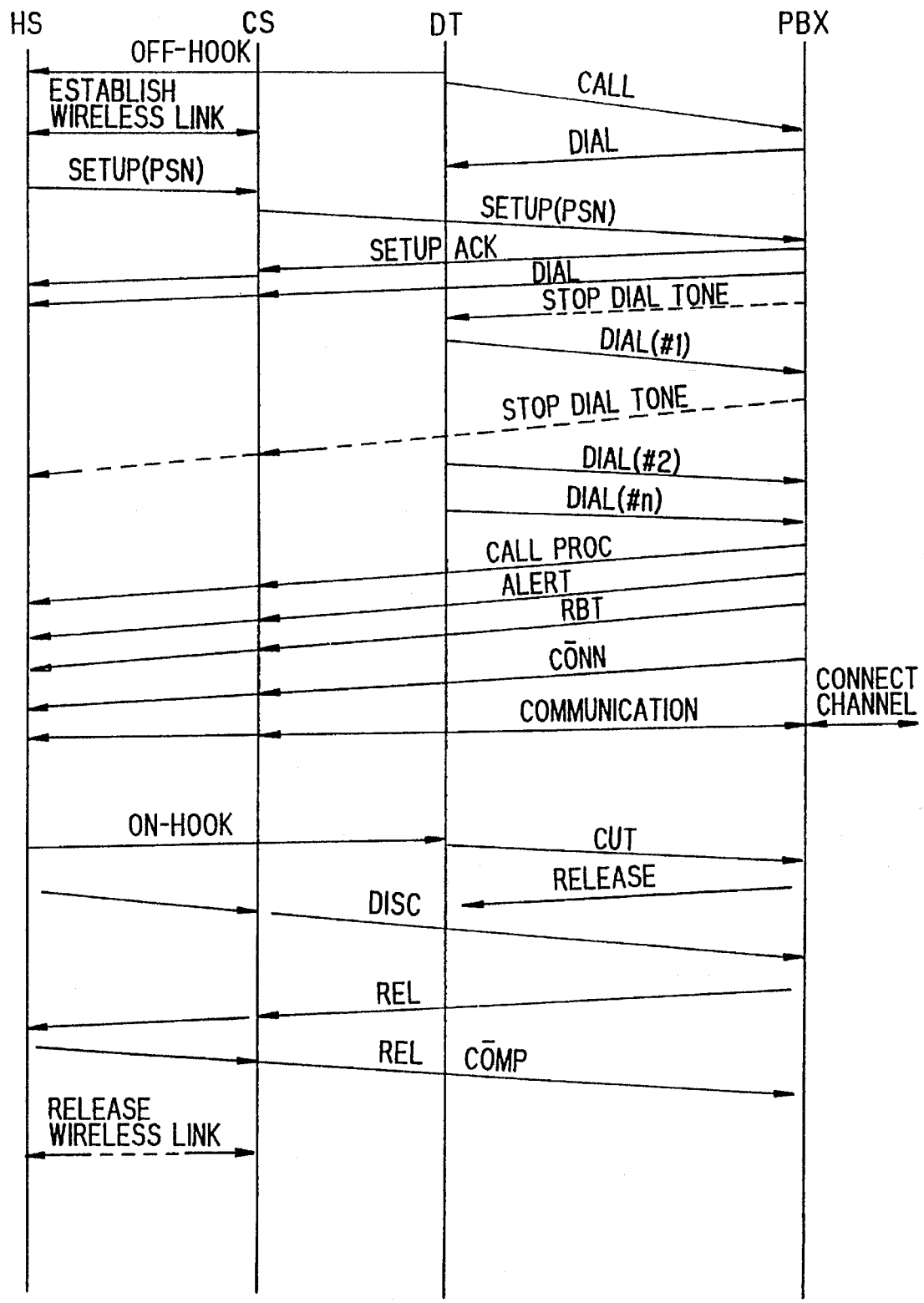
FIG. 6 is an explanatory view of the first calling process in the first embodiment.

FIG. 6 explains the calling process.

When the cordless terminal (HS) 31 is lifted from the charging rest 21a of the wire telephone (DT) 21, the wire telephone (DT) 21 detects the noncontact (off-hook) state of the cordless terminal 31 from the switch CSW (FIG. 2). The wire telephone DT then checks whether or not the calling operation key CK (FIG. 3) is pressed down so as to instruct the calling operation. If the calling operation key CK is pressed down, the wire telephone DT supplies a call signal to the PBX 11 and the PBX 11 transmits the dial tone to the wire telephone DT in response to the call signal. If the calling operation key CK is not pressed down, the calling operation is not executed.

In parallel with this process, the cordless terminal (HS) detects the off-hook state and establishes a wireless link with the cordless connecting device (CS).

When the wireless link is established, the cordless terminal HS supplies a SETUP message for setting a calling operation (which includes the telephone number PSN of the cordless terminal) to the PBX 11 through the cordless connecting device CS. The PBX 11 returns a SETUP ACK message for confirming the calling process to the cordless terminal HS, supplies a dial tone to the cordless terminal HS and stops the transmission of the dial tone to the wire telephone DT.

When the first digit of the called party is input by the key operation on the wire telephone DT, the PBX 11 stops the transmission of the dial tone and thereafter receives the whole digits of the telephone number of the called party from the wire telephone DT. When the PBX 11 receives the whole digits of the telephone number of the called party, the PBX 11 transmits a CALL PROC message indicating that it is in the process of the calling operation to the cordless terminal HS, and then transmits an ALERT message indicating that the called party is being called and a ringing back tone RBT to the cordless terminal HS.

If the called party responds to the call and lifts the receiver, the PBX 11 supplies a CONN message to the cordless terminal HS and establishes a speech channel between the cordless terminal HS and the terminal of the called party, thereby enabling the communication between the caller party and the called party.

When the cordless terminal HS is mounted on the charging rest of the wire telephone DT at the end of the communication, the cordless terminal HS assumes the on-hook (contact) state. The wire telephone DT therefore supplies a cut signal to the PBX, and the PBX releases the wire telephone DT. The cordless terminal HS supplies a DISC message for requesting a release from the calling process to the PBX 11 through the cordless connecting device CS and the PBX 11 supplies a REL message indicating the end of the channel cutting operation to the cordless terminal HS. The cordless terminal HS then supplies a REL COMP message to the PBX. Finally, the cordless terminal HS releases the wireless link with the cordless connecting device CS, thereby finishing a series of calling process.

(f-2) Calling process 2

Figure 7:
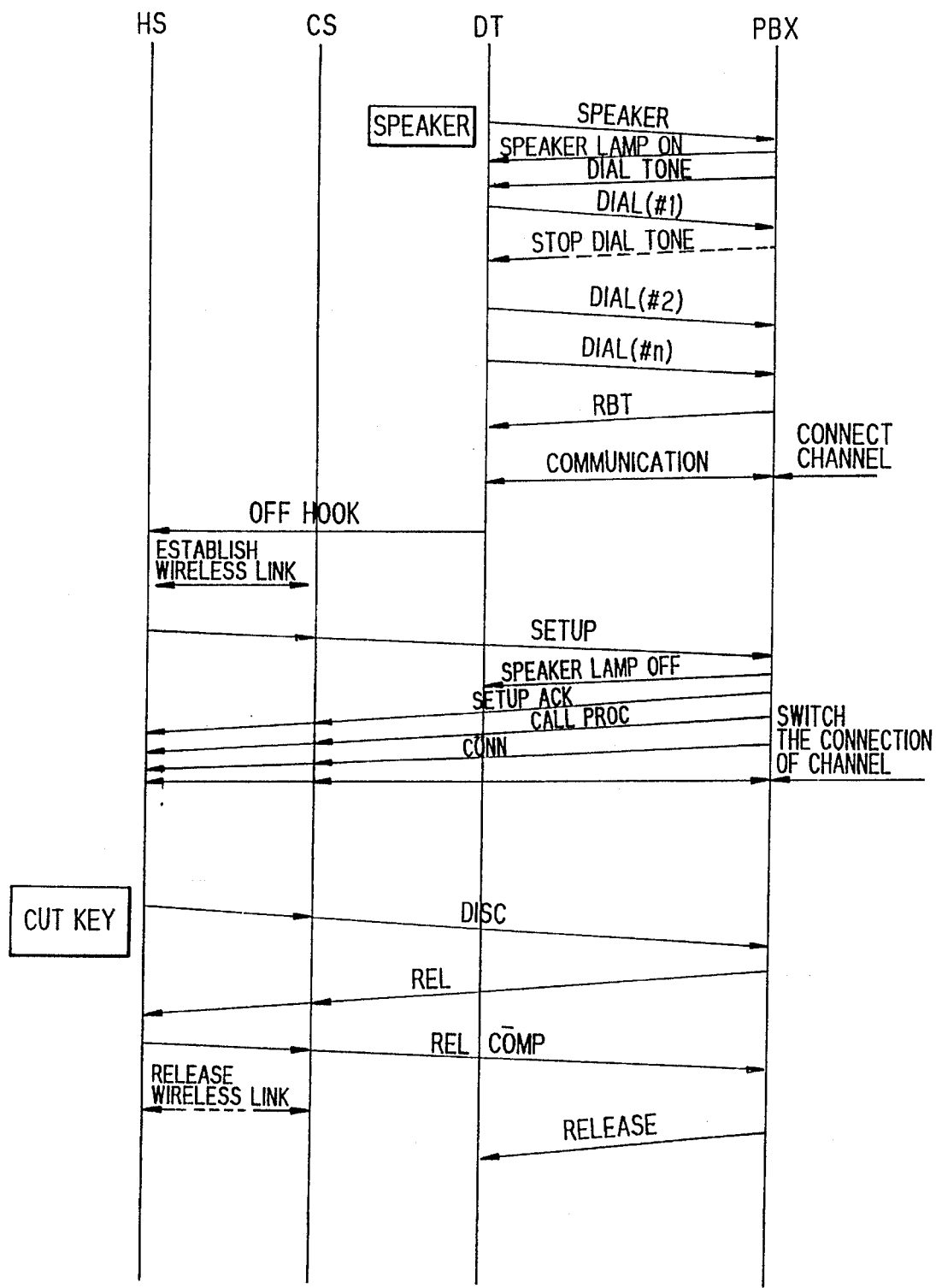
FIG. 7 is an explanatory view of the second calling process in the first embodiment.

The calling process 1 is executed when the cordless terminal HS is lifted from the charging rest of the wire telephone DT and the telephone number of the called party is input by the wire telephone DT. Alternatively, it is possible to call the called party without lifting the cordless terminal HS from the wire telephone DT. FIG. 7 shows the calling process in such a case.

When the speaker key SK of the wire telephone DT is pressed down, the wire telephone DT supplies a speaker signal to the PBX 11. When the PBX 11 receives the speaker signal, the PBX 11 supplies a speaker-lamp-on signal to the wire telephone DT so as to turn on the lamp of the speaker key SK and transmits a dial tone to the wire telephone DT. When the first digit of the called party is input by the key operation on the wire telephone DT, the PBX 11 stops the transmission of the dial tone. When the PBX 11 receives the whole digits of the telephone number of the called party from the wire telephone DT, the PBX 11 calls the telephone of the caller party and transmits a ringing back tone RBT to the wire telephone DT. In this case, the ringing back tone RBT is output from the speaker SP of the wire telephone DT (FIG. 2). If the called party responds the call and lifts the receiver, the PBX 11 establishes a speech channel between the wire telephone DT and the terminal of the called party, thereby enabling the communication between the caller party and the called party. In this case, it is possible to speak with the called party through the speaker SP and the microphone MC with the hands free without using the cordless terminal HS.

If the cordless terminal HS is taken from the wire telephone DT after the establishment of the speech channel, the cordless terminal HS detects the off-hook state and establishes a wireless link with the cordless connecting device (CS) 41. When the wireless link is established, the cordless terminal HS supplies a SETUP message for setting a calling operation to the PBX 11 through the cordless connecting device CS.

When the PBX 11 receives the SETUP message, the PBX 11 transmits a speaker-lamp-off signal to the wire telephone DT so as to turn off the speaker lamp, and returns a SETUP ACK message for confirming the calling process to the cordless terminal HS. The PBX 11 then transmits a CALL PROC message indicating that it is in the process of the calling operation to the cordless terminal HS, and then transmits a CONN message to the cordless terminal HS so as to establish a speech channel between the cordless terminal HS and the terminal of the called party, thereby enabling the communication between the caller party and the called party.

When the cut key DCK of the cordless terminal HS is pressed down at the end of the communication, the cordless terminal HS supplies a DISC message for requesting a release from the calling process to the PBX 11 through the cordless connecting device CS and the PBX 11 supplies a REL message indicating the end of channel cutting to the cordless terminal HS. The cordless terminal HS then supplies a REL COMP message to the PBX. Finally, the cordless terminal HS releases the wireless link with the cordless connecting device CS, thereby finishing a series of calling process.

(f-3) Calling process 3

The calling process 1 or 2 is executed in the state in which the cordless terminal HS is mounted on the wire telephone DT. It is also possible to call from the cordless terminal HS in the state of being separated from the wire telephone DT. In the calling process 3. The calling operation key CK on the wire telephone DT is not pressed down so as to prevent the calling operation when the cordless terminal HS is lifted from the wire telephone HS.

Figure 8:
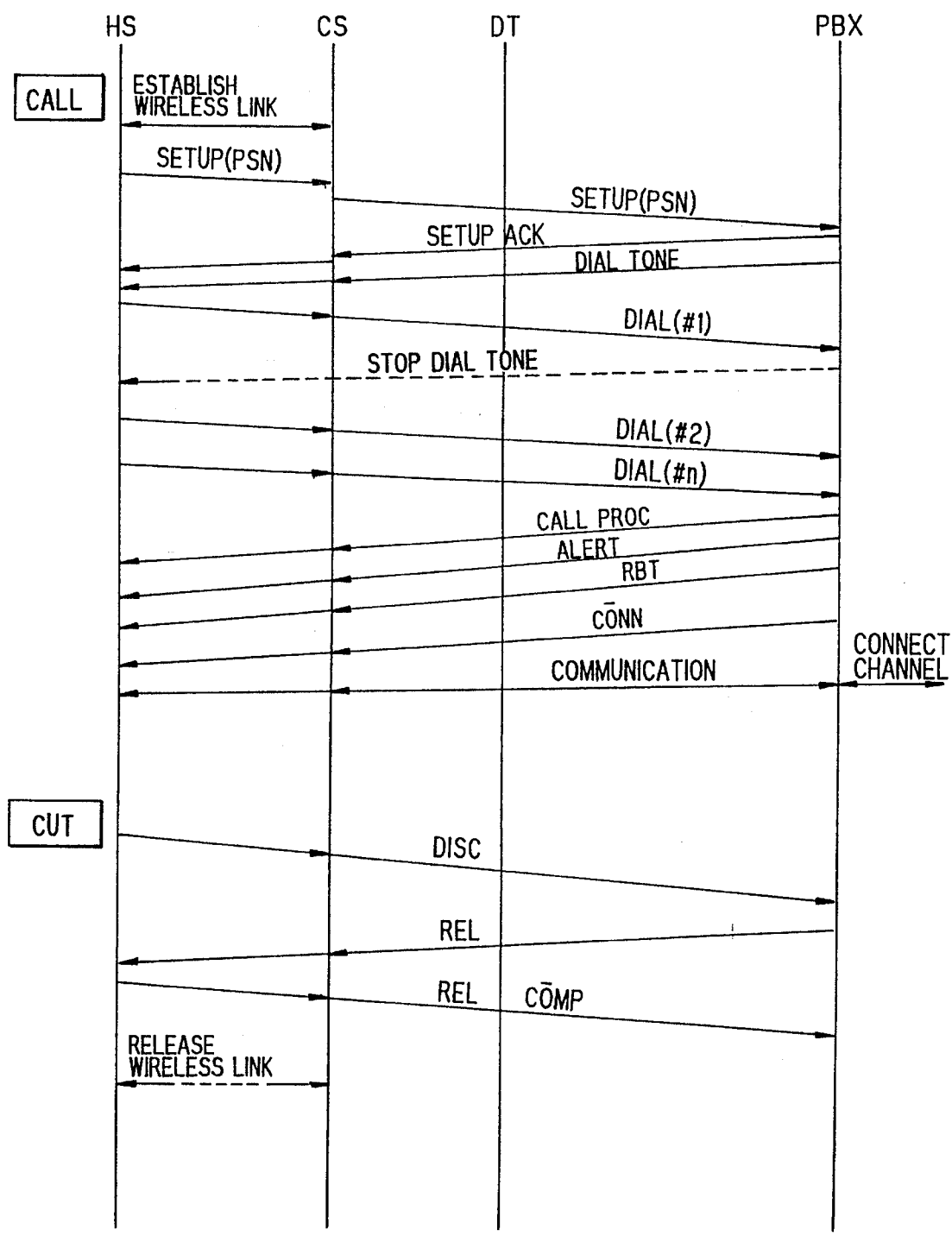
FIG. 8 is an explanatory view of the third calling process in the first embodiment.

In this case, the call key CLK (FIG. 3) on the cordless terminal HS is first pressed down and thereafter the telephone number of the called party is input on the cordless terminal HS. In order to end the communication, the cut key DCK is pressed down. FIG. 8 shows this calling process 3, which is similar to the calling process 1 shown in FIG. 6.

(g) Process of switching the speech channel during communication

If the speaker key SK is pressed down during communication, it is possible to change the connection of the speech channel from the speaker and the microphone of the wire telephone DT over to the cordless terminal HS or vice versa.

Figure 9:
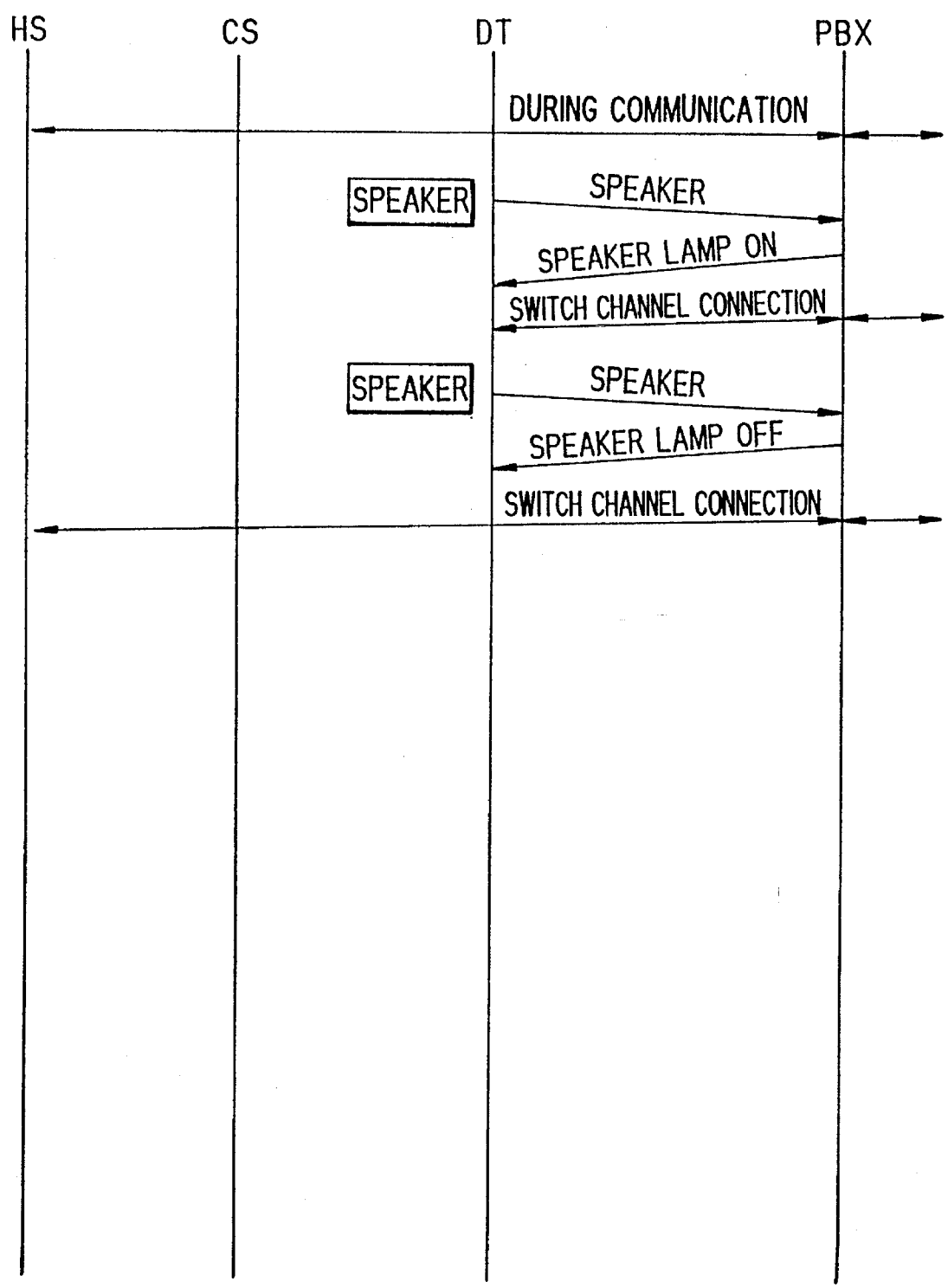
FIG. 9 is an explanatory view of the process for switching the speech channel during communication in the first embodiment.

FIG. 9 shows such a channel switching process.

If the speaker key SK of the wire telephone DT is pressed down during the establishment of the speech channel, the wire telephone DT transmits a speaker signal to the PBX 11. When the PBX 11 receives the speaker signal, the PBX 11 transmits a speaker-lamp-on signal to the wire telephone DT so as to turn on the lamp of the speaker key SK and simultaneously switches the connection of the speech channel from the cordless terminal HS over to the wire telephone DT (speaker SP, microphone MC). Thereafter, it is possible to communicate with the called party with the hands free.

If the speaker key SK of the wire telephone DT is pressed down during the establishment of the speech channel with the wire telephone DT, the wire telephone DT transmits a speaker signal to the PBX 11. When the PBX 11 receives the speaker signal, the PBX 11 transmits a speaker-lamp-off signal to the wire telephone DT so as to turn off the lamp of the speaker key SK and simultaneously switches the connection of the channel from the wire telephone DT over to the cordless terminal HS. Thereafter, it is possible to communicate with the called party by using the cordless terminal HS.

(H) Transfer process

Figure 10:
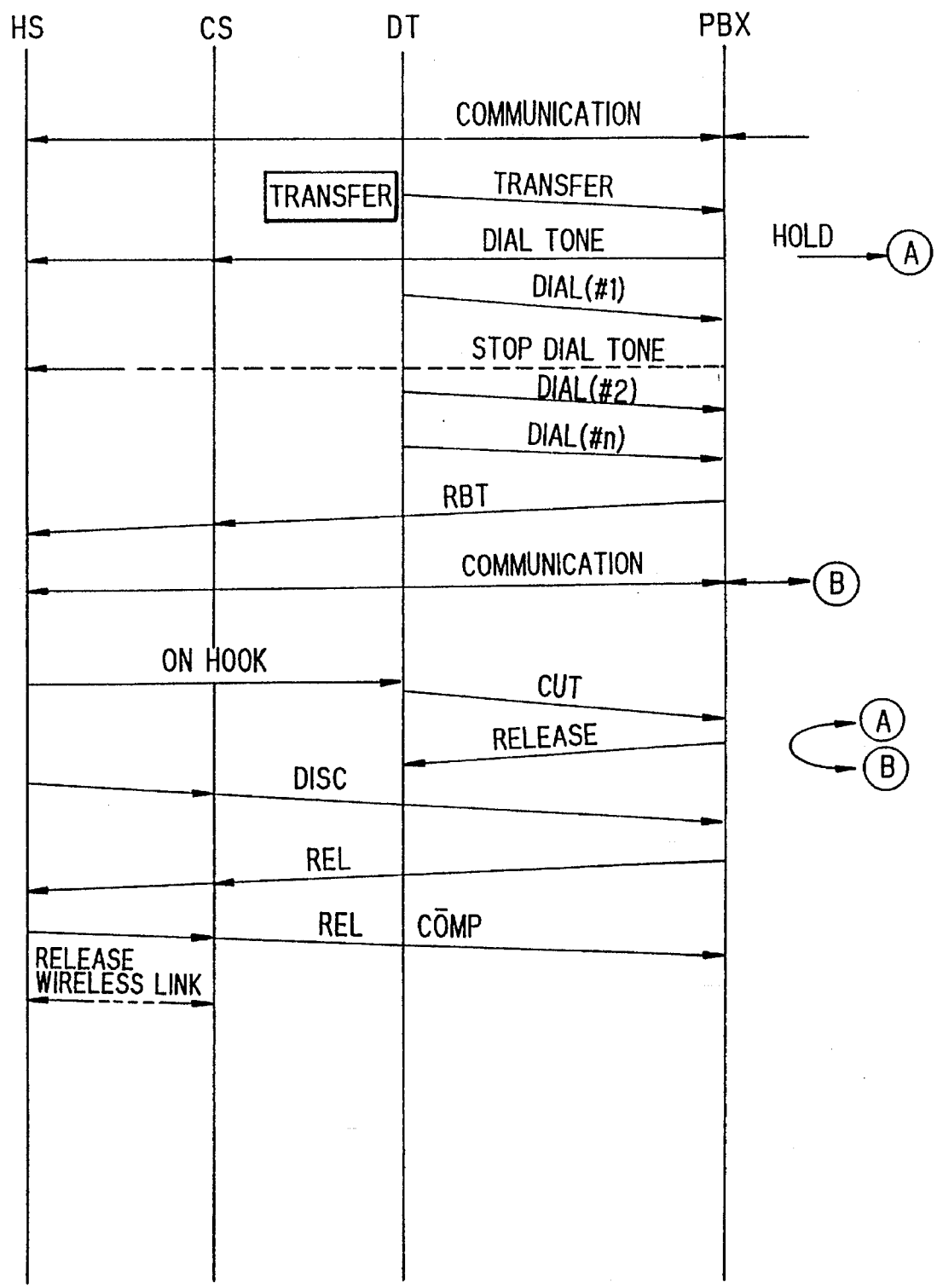
FIG. 10 is an explanatory view of a transfer process in the first embodiment.

It is possible to transfer the call to a third party other than the caller party and the called party during communication. FIG. 10 shows such a transfer process.

If the transfer key TK on the wire telephone DT is pressed down during the establishment of a speech channel with the cordless terminal HS, the wire telephone DT transmits a transfer signal to the PBX 11. When the PBX 11 receives the transfer signal, it transfers a dial tone to the cordless terminal HS while holding the line with the party (A).

When the first digit of the third party is input by the key operation on the wire telephone DT, the PBX 11 stops the transmission of the dial tone. When the PBX 11 receives the whole digits of the telephone number, the PBX 11 transmits a ringing back tone RBT.

If the called party (B) responds to the call and lifts the receiver, the PBX 11 establishes a speech channel between the cordless terminal HS and the terminal of the called party (B) to which the telephone is being transferred, thereby enabling communication with the called party (B). The party at the cordless terminal HS tells the called party (B) that the telephone is to be transferred thereto and mounts the cordless terminal HS on the charging rest of the wire telephone DT in the on-hook (contact) state. Due to the on-hook state, the wire telephone DT supplies a cut signal to the PBX. When the PBX receives the cut signal, it establishes a channel between the parties (A) and (B) and releases the wire telephone DT. The cordless terminal HS supplies a DISC message requesting a release from the calling process to the PBX 11 through the cordless connecting device CS and the PBX 11 supplies a REL message indicating the end of the channel cutting operation to the cordless terminal HS. The cordless terminal HS then supplies a REL COMP message to the PBX. Finally, the cordless terminal HS releases the wireless link with the cordless connecting device, thereby finishing the transfer process.

(i) Incoming call process

When an incoming call terminates at the wire telephone, the PBX judges whether or not the cordless terminal is on the charging rest (contact state/noncontact state). If the cordless terminal is in the noncontact state, the PBX calls the cordless terminal, while if the cordless terminal is in the contact state, the PBX calls the wire telephone. In this way, if the owner of the wire telephone carries the cordless terminal when he leaves the desk, it is possible to receive an incoming call to the owner by the cordless terminal with certainty.

Figure 11:
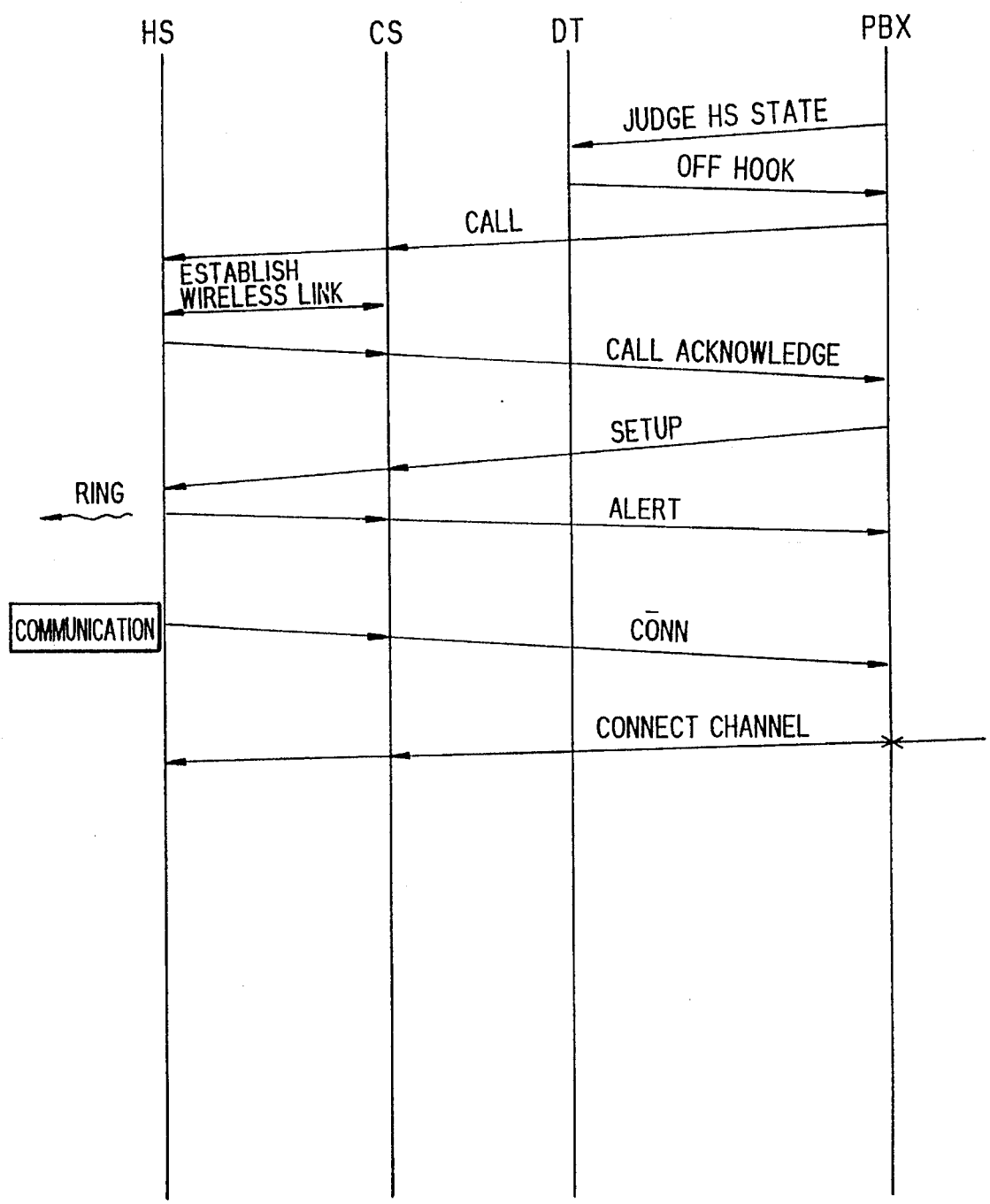
FIG. 11 is an explanatory view of the first incoming call process in the first embodiment.
Figure 12:
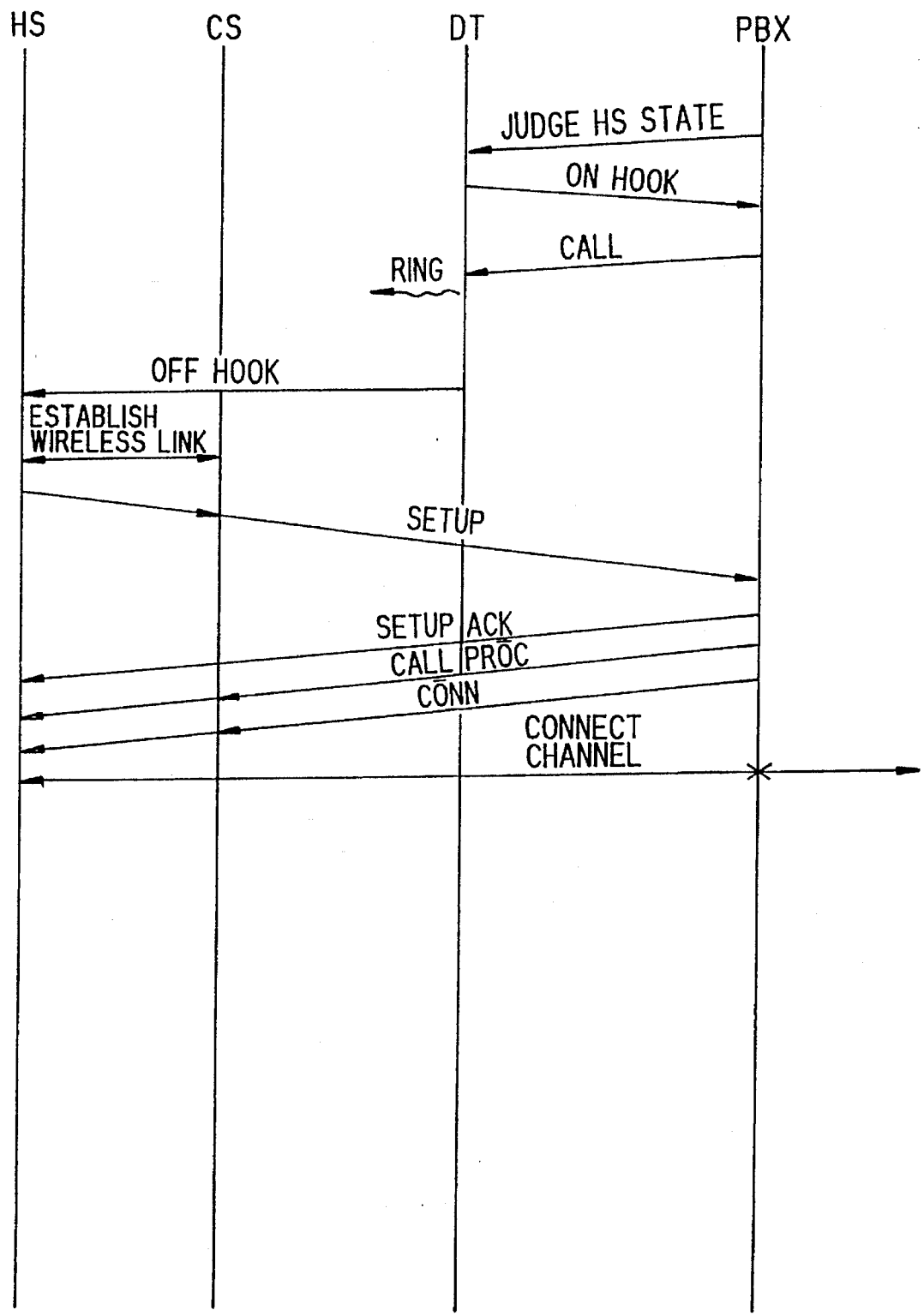
FIG. 12 is an explanatory view of the second incoming call process in the first embodiment

FIGS. 11 and 12 show such a receiving process.

When an incoming call is terminated at the wire telephone DT, the PBX 11 judges whether or not the cordless terminal HS is on the charging rest (contact state/noncontact state). If the cordless terminal HS is in the noncontact state, the wire telephone DT returns an off-hook signal to the PBX 11. The PBX 11 judges that the called party is not at the desk but has moved to another place while carrying the cordless terminal HS. The PBX 11 then identifies the zone in which the cordless terminal HS corresponding to the wire telephone DT exists by reference to the relationships 11c-1 and 11c-2 of the main storage portion MM (FIG. 2).

If the zone is identified, the PBX supplies a reception signal to the cordless terminal HS through the cordless connecting device CS in the zone. When the cordless terminal HS receives the call, the cordless terminal HS establishes a wireless link with the cordless connecting device CS. Thereafter, the cordless terminal HS returns a response to the incoming call to the PBX 11, When the PBX 11 receives the response, it supplies a SETUP message to the cordless terminal HS.

When the cordless terminal HS receives the SETUP message, it rings and supplies an ALERT message to the PBX 11. When the called party presses down the communication key (serving also as the call key CLK), the cordless terminal HS supplies a CONN message to the PBX 11. In this way, a speech channel between the cordless terminal HS and the terminal of the caller party establishes, thereby enabling communication (FIG. 11).

On the other hand, if the cordless terminal HS is on the charging rest, in other words, in the contact state when an incoming call is terminated at the wire telephone DT, the wire telephone DT returns an on-hook signal to the PBX 11 (FIG. 12). The PBX 11 calls the wire telephone DT. If the cordless terminal HS is lifted when the wire telephone DT is called, the cordless terminal HS detects the off-hook state and establishes a wireless link with the cordless connecting device CS.

When the wireless link is established, the cordless terminal HS supplies a SETUP message for setting a calling process to the PBX 11 through the cordless connecting device CS. When the PBX 11 receives the SETUP message, it returns a SETUP ACK message for confirming the calling process to the cordless terminal HS. The PBX 11 then transmits a CALL PROC message indicating that it is in the process of the calling operation to the cordless terminal HS, and then transmits a CONN message to the cordless terminal HS so as to establish a speech channel between the cordless terminal HS and the terminal of the caller party, thereby enabling the communication between the caller party and the called party by using the cordless terminal HS.

(C) Second embodiment

In the first embodiment, the wire telephone DT is not provided with a hardware for transmitting and receiving a signal to and from the cordless terminal HS on a radio wave, but it is also possible to provide the wire telephone DT with such a hardware.

Figure 13:
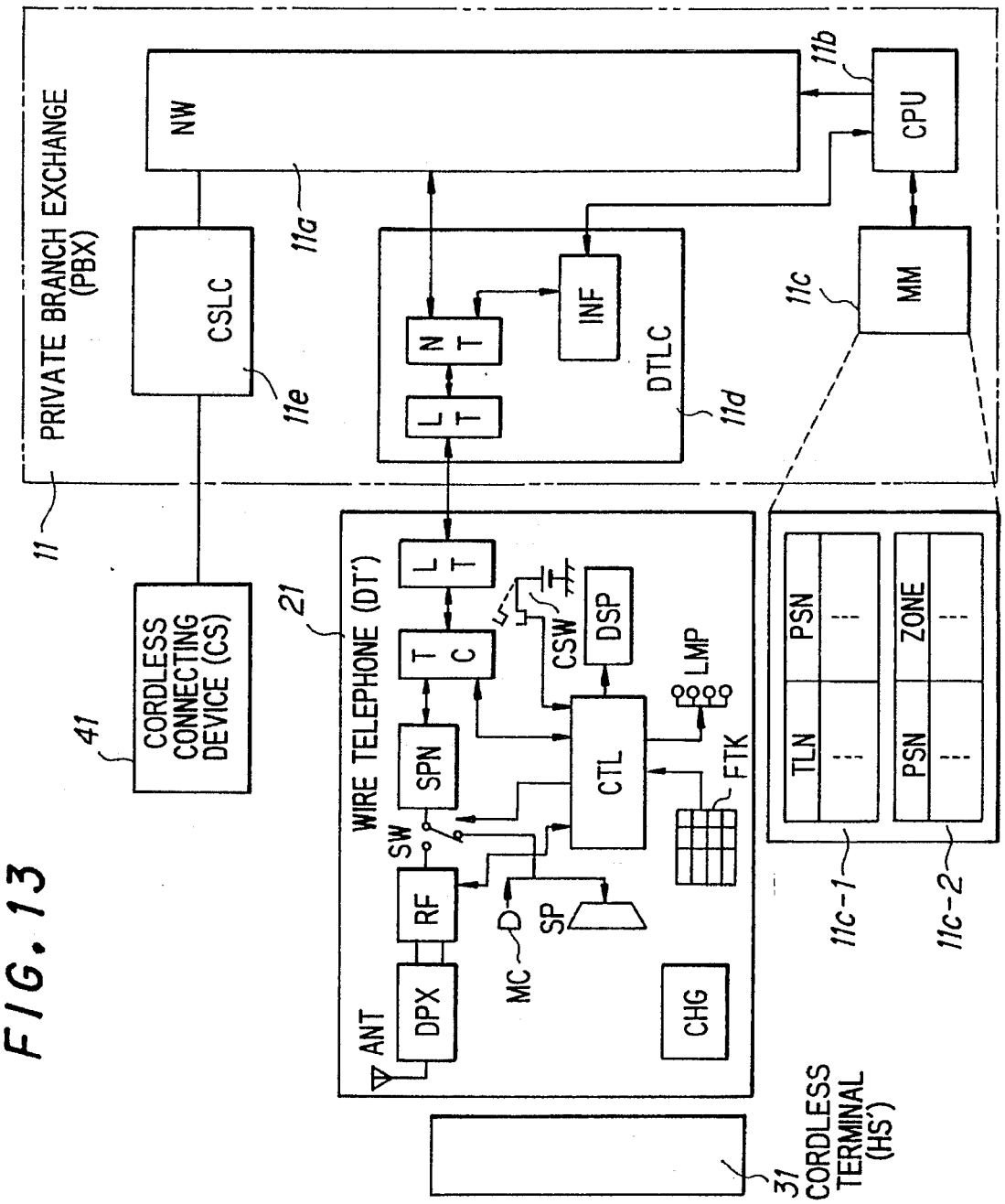
FIG. 13 shows the structure of a second embodiment of the present invention.

FIG. 13 shows the structure of a second embodiment of a cordless telephone terminal control system according to the present invention.

The same reference numerals are provided for the elements which are the same as those in the first embodiment. This embodiment is different from the first embodiment in (1) that a hardware (RF unit, duplex DPX, antenna ANT) for transmitting and receiving a signal to and from a cordless terminal HS' on a radio wave is provided, (2) that a switch SW for changing the speech channel circuit SPN over to the RF unit, the speaker and the microphohe is provided, and (3) that the cordless terminal HS' transmits and receives a signal to and from the PBX 11 not through the cordless connecting device but through a wire telephone DT' unless the caller calls from the cordless terminal HS' carried from the wire telephone DT'.

Various operations in the second embodiment will now be explained.

(a) Calling process (a-1) Calling process 1

Figure 14:
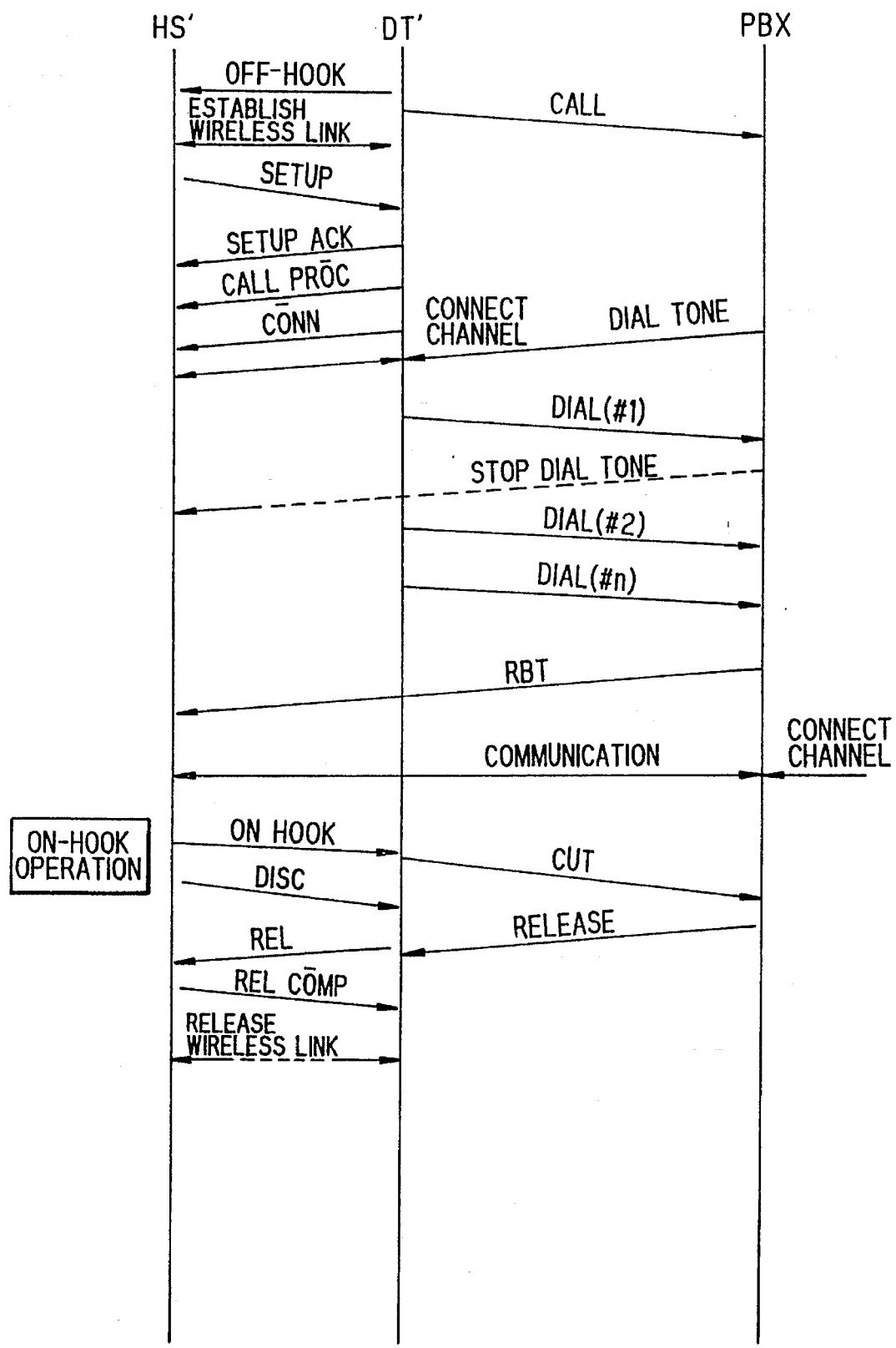
FIG. 14 is an explanatory view of the first calling process in the second embodiment.

FIG. 14 shows the calling process.

When the cordless terminal (HS') 31 is lifted from the charging rest 21a of the wire telephone (DT') 21, the wire telephone DT' detects the noncontact (off-hook) state of the cordless terminal 31 from the switch CSW (FIG. 13). The wire telephone DT' then checks whether or not the calling operation key CK (FIG. 3) is pressed down so as to instruct the calling operation. If the calling operation key CK is pressed down, the wire telephone DT' supplies a call signal to the PBX 11. If the calling operation key CK is not pressed down, the calling operation is not executed.

In parallel with this process, the cordless terminal HS' detects the off-hook state and establishes a wireless link with the wire telephone DT'. When the wireless link is established, the cordless terminal HS' supplies a SETUP message for setting a calling operation to the wire telephone DT'. The DT' returns a SETUP ACK message for confirming the calling process to the cordless terminal HS', transmits a CALL PROC message indicating that it is in the process of the calling operation to the cordless terminal HS', and then supplies a CONN message to the cordless terminal HS'. A wireless channel is thereby established between the cordless terminal HS' and the wire telephone DT'. Thereafter, the PBX 11 supplies a dial tone to the cordless terminal HS' through the wire telephone DT'.

When the first digit of the called party is input by the key operation on the wire telephone DT', the PBX 11 stops the transmission of the dial tone. When the PBX 11 receives the whole digits of the telephone number of the called party from the wire telephone DT', the PBX 11 transmits a ringing back tone RBT which indicates that the called party is being called. If the called party responds the call and lifts the receiver, the PBX 11 establishes a speech channel between the cordless terminal HS' and the terminal of the called party, thereby enabling communication between the caller party and the called party.

When the cordless terminal HS' is mounted on the charging rest of the wire telephone DT' at the end of the communication, the cordless terminal HS' assumes an on-hook (contact) state. The wire telephone DT' therefore supplies a cut signal to the PBX, and the PBX releases the wire telephone DT'. The cordless terminal HS' supplies a DISC message for requesting a release from the calling process to the wire telephone DT' and the wire telephone DT' supplies a REL message indicating the end of the channel cutting operation to the cordless terminal HS'. The cordless terminal HS' then supplies a REL COMP message to the wire telephone DT'. Finally, the cordless terminal HS' releases the wireless link with the wire telephone DT', thereby finishing a series of calling process.

(a-2) Calling process 2

Figure 15:
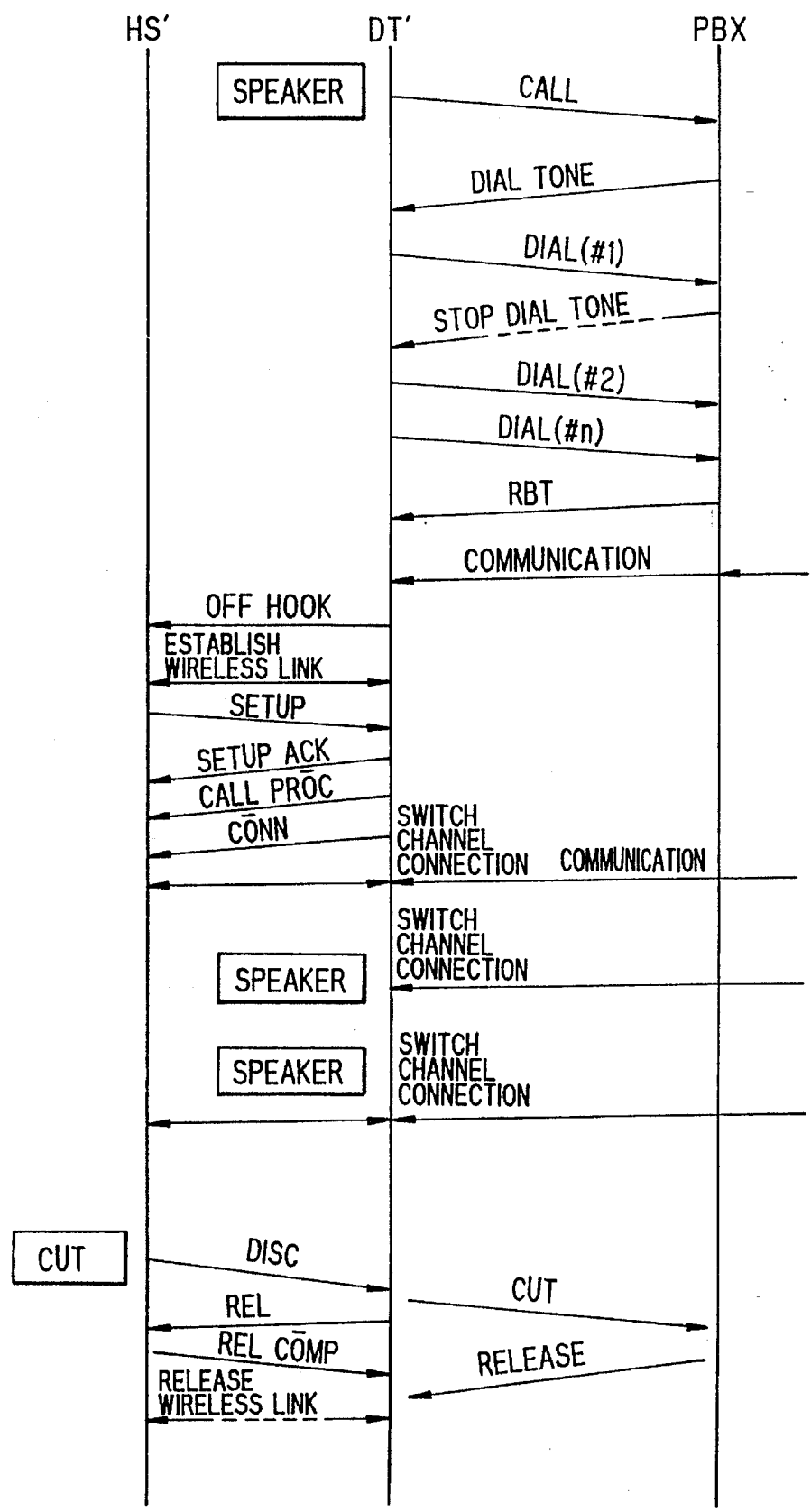
FIG. 15 is an explanatory view of the second calling process in the second embodiment.

The calling process 1 is executed when the cordless terminal HS' is lifted from the charging rest of the wire telephone DT' and the telephone number of the called party is input by the wire telephone DT'. Alternatively, it is possible to call the called party without lifting the cordless terminal HS' from the wire telephone DT'. FIG. 15 shows the calling process in such a case.

When the speaker key SK of the wire telephone DT' is pressed down, the wire telephone DT' supplies a call signal to the PBX 11. When the PBX 11 receives the call signal, the PBX 11 supplies a dial tone to the wire telephone DT'. When the first digit of the called party is input by the key operation on the wire telephone DT', the PBX 11 stops the transmission of the dial tone. When the PBX 11 receives the whole digits of the telephone number of the called party from the wire telephone DT', the PBX 11 calls the terminal of the called party and transmits a ringing back tone RBT to the wire telephone DT'. In this case, the ringing back tone RBT is output from the speaker SP of the wire telephone DT'. If the called party responds the call and lifts the receiver, the PBX 11 establishes a speech channel between the wire telephone DT' and the terminal of the called party, thereby enabling the communication between the caller party and the called party. In this case, it is possible to speak with the called party through the speaker SP and the microphone MC with the hands free without using the cordless terminal HS'.

If the cordless terminal HS' is taken from the wire telephone DT' after the establishment of the channel, the cordless terminal HS' detects the off-hook state and establishes a wireless link with the wire telephone DT'. When the wireless link is established, the cordless terminal HS' supplies a SETUP message for setting a calling operation to the wire telephone DT'. When the wire telephone DT' receives the SETUP message, it returns a SETUP ACK message for confirming the calling process to the cordless terminal HS'. The wire telephone DT' then transmits a CALL PROC message indicating that it is in the process of the calling operation to the cordless terminal HS', then transmits a CONN message to the cordless terminal HS', and thereafter changes the speech channel over to the cordless terminal HS'. Communication between the caller party and the called party by using the cordless terminal HS' is thereby enabled.

If the speaker key SK is pressed down during communication, the connection of the channel is changed from the speaker and the microphone of the wire telephone DT' overt to the cordless terminal HS' or vice versa.

When the cut key DCK of the cordless terminal HS' is pressed down at the end of the communication, the cordless terminal HS' supplies a DISC message for requesting a release from the calling process to the wire telephone DT' and the wire telephone DT' supplies a cut signal to the PBX. The PBX releases the wire telephone DT'. The wire telephone DT' supplies a REL message indicating the end of the channel cutting operation to the cordless terminal HS'. The cordless terminal HS' supplies a REL COMP message to the wire telephone DT'. Finally, the cordless terminal HS' releases the wireless link with the wire telephone DT', thereby finishing a series of calling process.

(b) Transfer process

Figure 16:
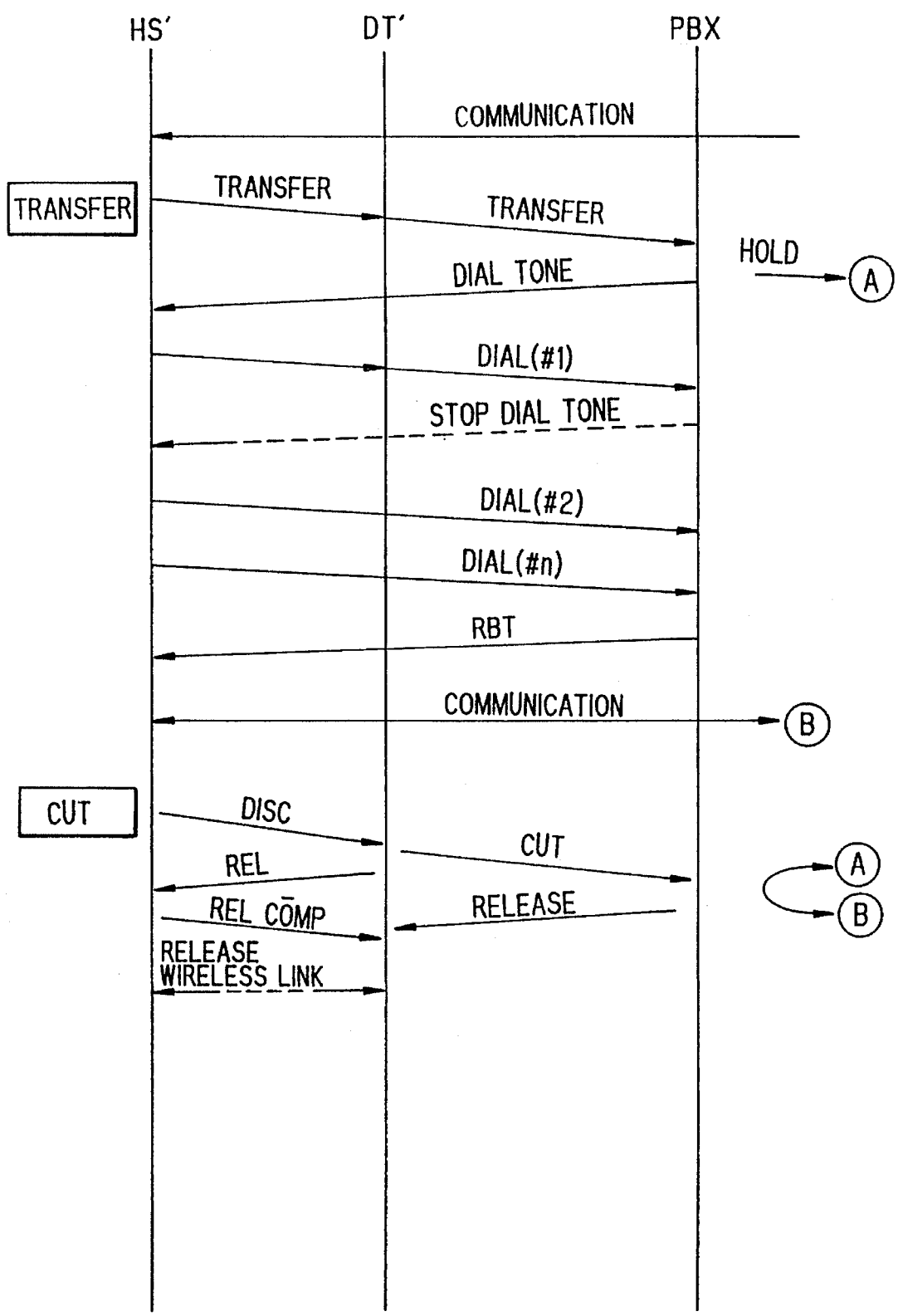
FIG. 16 is an explanatory view of a transfer process in the second embodiment.

It is possible to transfer the call to a third party other than the caller party and the called party during communication. FIG. 16 shows such a transfer process.

If the transfer key TK on the cordless terminal HS' is pressed down during the establishment of a speech channel with the cordless terminal HS', the cordless terminal HS' transmits a transfer signal to the PBX 11 through the wire telephone DT'. When the PBX 11 receives the transfer signal, it transfers a dial tone to the cordless terminal HS' while holding the line with the party (A).

When the first digit of the third party is input by the key operation on the cordless terminal HS', the PBX 11 stops the transmission of the dial tone. When the PBX 11 receives the whole digits of the telephone number from the cordless terminal HS', the PBX 11 transmits a ringing back tone RBT. If the called party (B) responds to the call and lifts the receiver, the PBX 11 establishes a speech channel between the cordless terminal HS' and the terminal of the called party (B) to which the telephone is being transferred, thereby enabling communication with the called party (B). The party at the cordless terminal HS' tells the called party (B) that the telephone is to be transferred thereto and presses down the cut key DCK. The cordless terminal HS' supplies a DISK message requesting a release from the calling process to the wire telephone DT' and the wire telephone DT' supplies a cut signal to the PBX. When the PBX receives the cut signal, it establishes the speech channel between the parties (A) and (B) and releases the wire telephone DT'. The wire telephone DT' supplies a REL message indicating the end of the channel cutting operation to the cordless terminal HS'. The cordless terminal HS' supplies a REL COMP message to the wire telephone DT'. Finally, the cordless terminal HS' releases the wireless link with the wire telephone DT', thereby finishing the transfer process.

(c) Incoming call process

When an incoming call is terminated at the wire telephone DT', the PBX judges whether or not the cordless terminal is on the charging rest (contact state/non-contact state). If the cordless terminal is in the non-contact state, the PBX calls the cordless terminal, while if the cordless terminal is in the contact state, the PBX calls the wire telephone.

Figure 17:
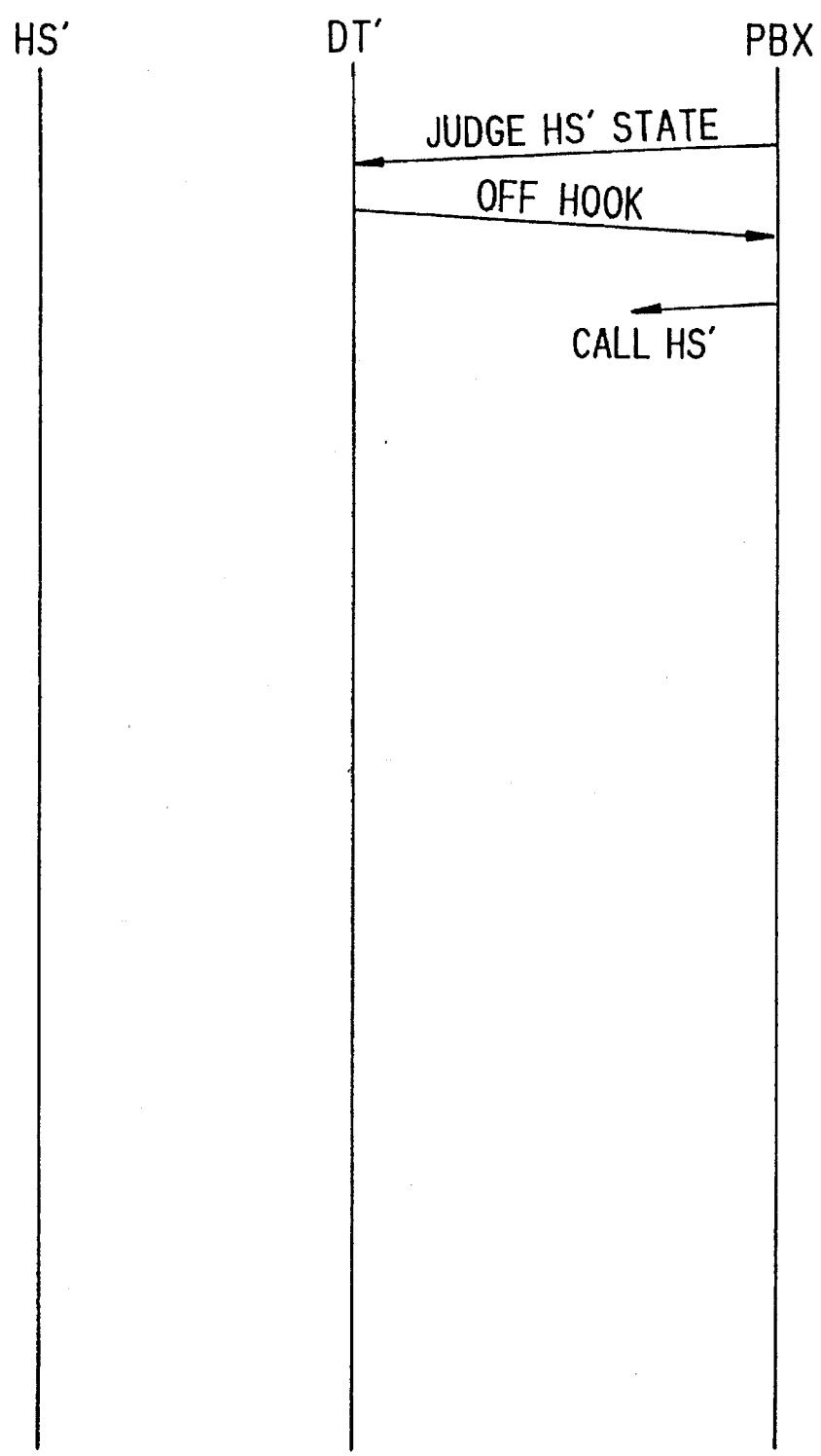
FIG. 17 is an explanatory view of the first incoming call process in the second embodiment.
Figure 18:
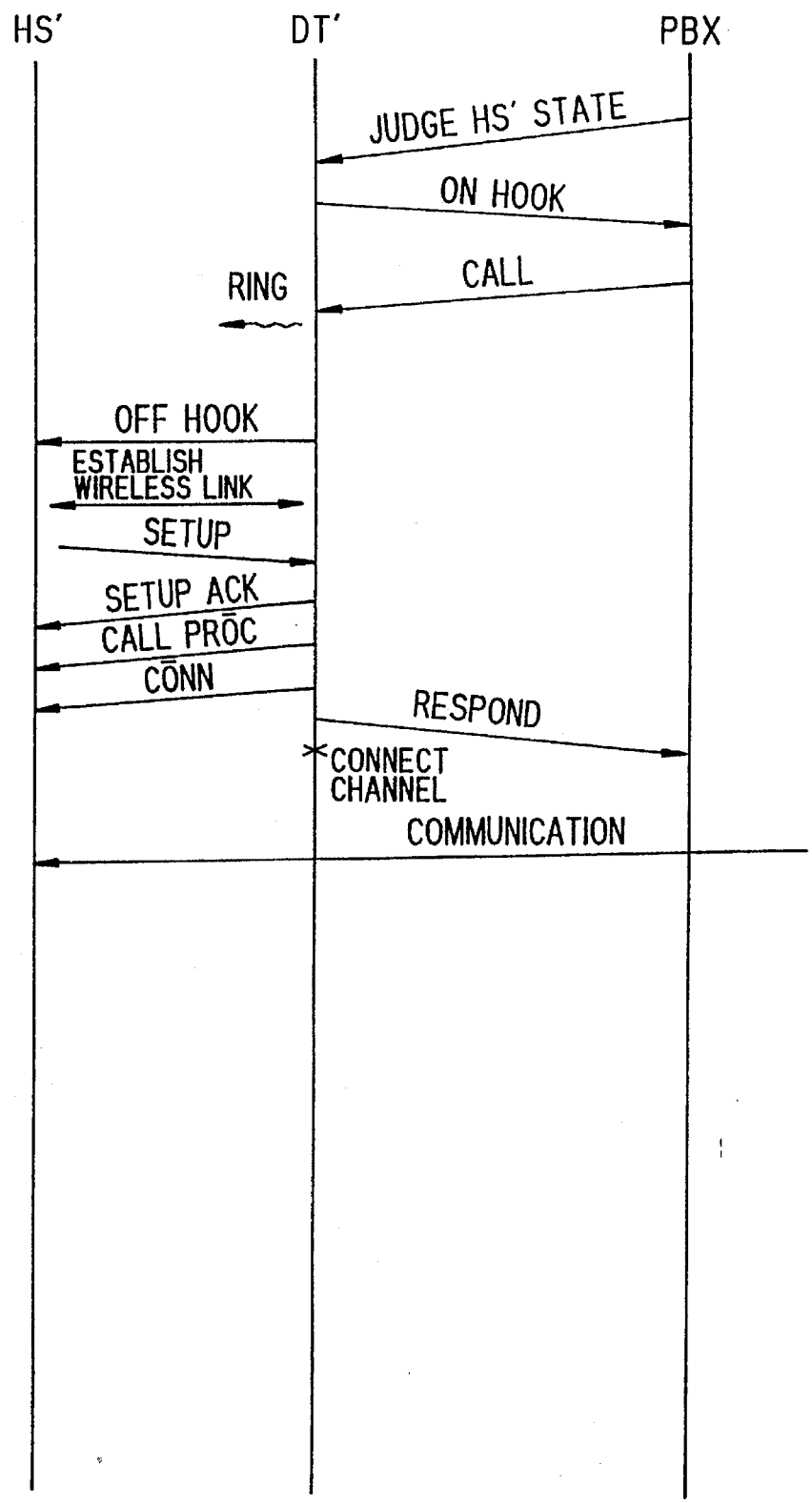
FIG. 18 is an explanatory view of the second incoming call process in the second embodiment
Figure 19:
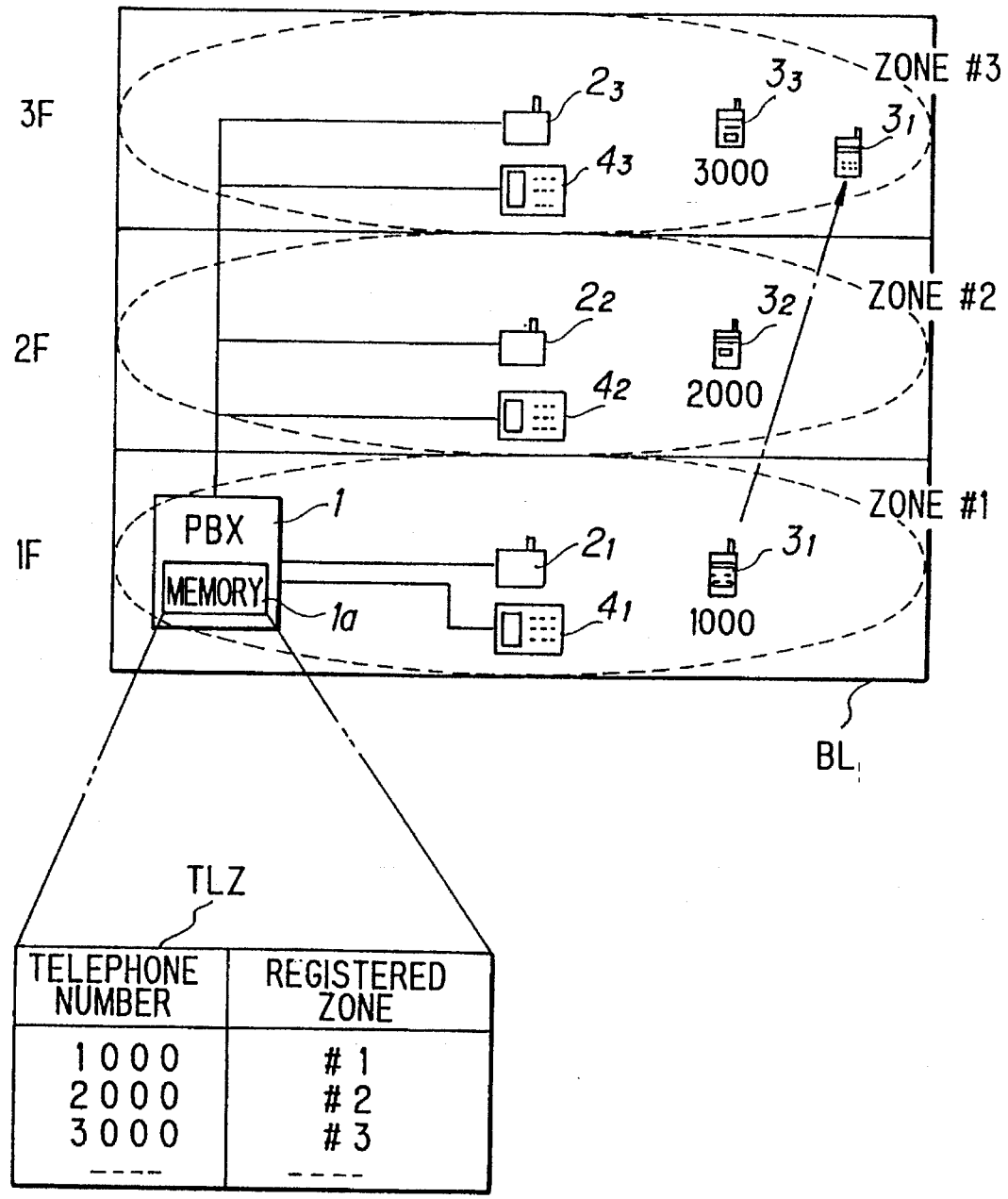
FIG. 19 shows the structure of a conventional multizone type cordless telephone system.
Figure 20:
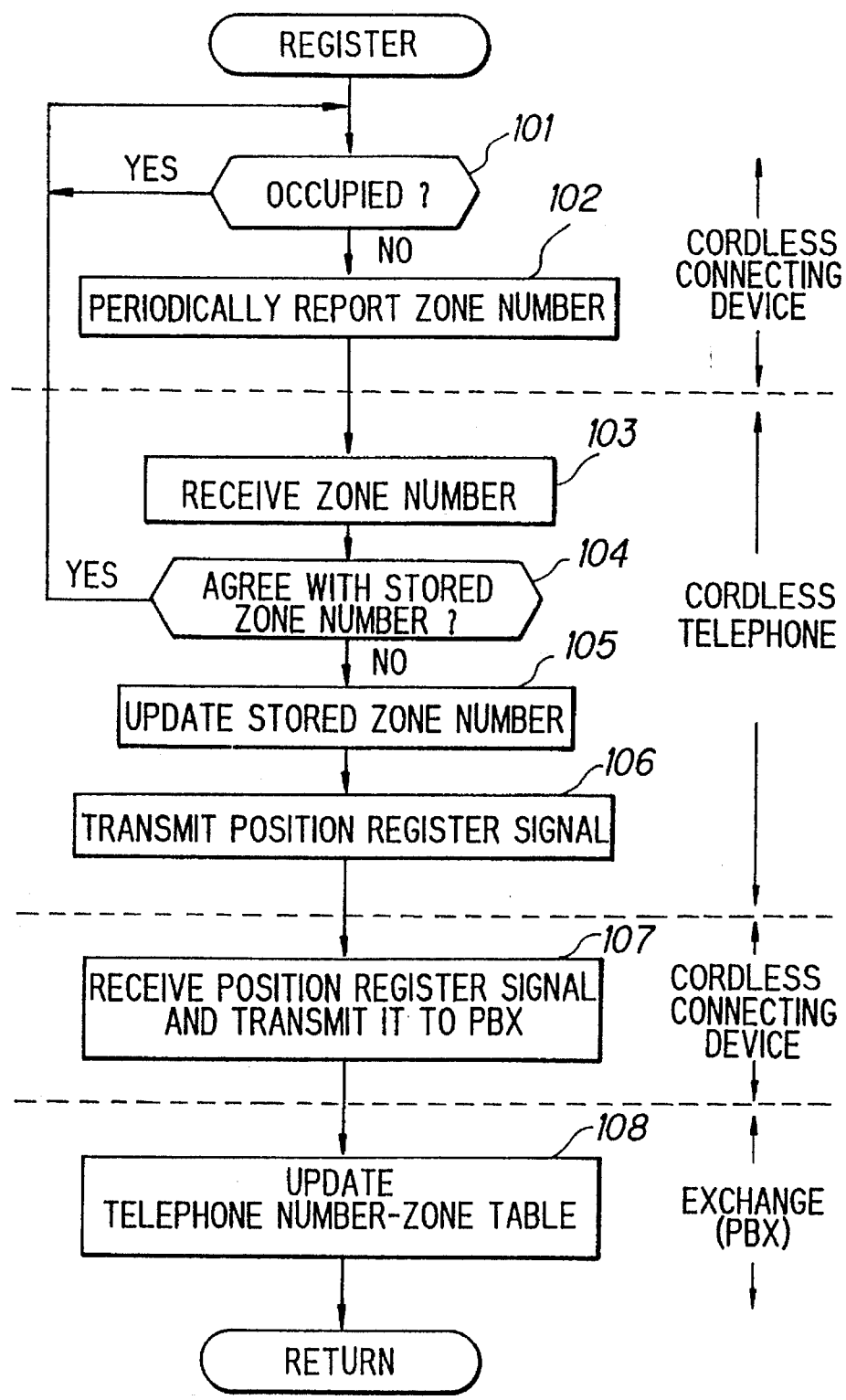
FIG. 20 is a flowchart of the process for registering the position of each cordless telephone in a multi-zone type cordless telephone system.

FIGS. 17 and 18 explain such an incoming call process.

When an incoming call is terminated at the wire telephone DT', the PBX 11 judges whether or not the cordless terminal HS' is on the charging rest (contact state/non-contact state). If the cordless terminal HS' is not on the charging rest, i.e., in the non-contact state, the wire telephone DT' returns an off-hook signal to the PBX 11. The PBX 11 judges that the called party is not at the desk but has moved to another place while carrying the cordless terminal HS'. The PBX 11 then identifies the zone in which the cordless terminal HS' corresponding to the wire telephone DT' is located by reference to the relationships 11c-1 and 11c-2 of the main storage portion MM (FIG. 13).

If the zone is identified, the PBX supplies an incoming call signal to the cordless terminal HS' through the cordless connecting device CS' in the zone. Thereafter, the same process as that shown in FIG. 11 is executed, thereby establishing a speech channel between the cordless terminal HS' and the terminal of the caller party and enabling communication (FIG. 17).

On the other hand, if the cordless connecting device HS' is on the charging rest, in other words, in the contact state when an incoming call is terminated at the wire telephone DT', the wire telephone DT' returns an on-hook signal to the PBX 11 (FIG. 18). The PBX 11 calls the wire telephone DT'. If the cordless terminal HS' is lifted when the wire telephone DT' is called, the cordless terminal HS' detects the off-hook state and establishes a wireless link with the wire telephone DT'.

When the wireless link is established, the cordless terminal HS' supplies a SETUP message for setting a calling process to the wire telephone DT'. When the wire telephone DT' receives the SETUP message, it returns a SETUP ACK message for confirming the calling process to the cordless terminal HS'. The wire telephone DT' then transmits a CALL PROC message indicating that it is in the process of the calling operation to the cordless terminal HS', and then transmits a CONN message to the cordless terminal HS'. In this way, a wireless channel between the cordless terminal HS' and the wire telephone DT' is established.

Thereafter, the wire telephone DT' returns a response to the PBX 11 so as to establish a speech channel between the cordless terminal HS' and the terminal of the caller party, thereby enabling the communication between the caller party and the called party by using the cordless terminal HS'.

As described above, according to the present invention, it is possible to use a cordless terminal in the same way as a handset so that it is not necessary to provide a handset for a wire telephone. In addition, it is possible to use a cordless terminal in the same way as a secondary phone of a cordless home telephone, thereby enhancing the convenience.

According to the present invention, since a speaker, a microphone and a speaker key are provided in a wire telephone and the connection of a speech channel is switched between the wire telephone and the cordless terminal every time the speaker key is pressed down, it is possible to communicate with a called party by using the cordless terminal or with the hands free, as occasion demands.

In addition, according to the present invention, since it is possible to instruct whether or not a calling operation is to be executed when the cordless terminal assumes a non-contact (off-hook) state by setting a calling operation key on the wire telephone, it is possible to inhibit a calling operation when the cordless terminal is taken from the wire telephone so as to be carried.

Furthermore, according to the present invention, when an incoming call is terminated at the wire telephone, whether the wire telephone is in the on-hook (contact) state or the off-hook (non-contact) state is judged. If the wire telephone is in the off-hook state, the cordless terminal is called through the cordless connecting device, while if the wire telephone is in the on-hook state, the wire telephone is called. In this way, if the owner of the wire telephone carries the cordless terminal when he leaves the desk, it is possible to receive an incoming call to the owner with certainty.

According to the present invention, installment of a wireless interface on a wire telephone is not always necessary, thereby enabling a reduction in the size of hardware.

As many apparently widely different embodiments of the present invention can be made without departing from the spirit and scope thereof, it is to be understood that the invention is not limited to the specific embodiments thereof except as defined in the appended claims.

What is claimed is:

1. A cordless telephone terminal control system comprising:

wire telephones;

cordless terminals provided in correspondence with said wire telephones and having both a function as a handset of a wire telephone and a function as a cordless terminal;

cordless connecting devices for transmitting and receiving a signal to and from said cordless terminals on a radio wave; and an exchange which is connected to said wire telephones and said cordless connecting devices;

wherein said exchange includes a memory for registering a relationship between said wire telephones and said cordless terminals;

one of said wire telephones transmits a call signal to said exchange when the corresponding cordless terminal is taken from said wire telephone and then transmits a connection number of a called party which is input by a key operation to said exchange; and said exchange obtains a cordless terminal corresponding to said wire telephone which was called from the relationship stored in said memory, executes a call setting process between said exchange and said cordless terminal through a predetermined cordless connecting device on the basis of said connection number input thereto, and establishes a speech channel between said cordless terminal and the telephone terminal of the called party.

2. A cordless telephone terminal control system according to claim 1, wherein said wire telephone includes a speaker, a microphone and a speaker key, and the exchange changes the connection of said speech channel alternately between said wire telephone and said cordless terminal every time said speaker key is operated.

3. A cordless telephone terminal control system according to claim 1, wherein said cordless terminal includes a cut key; and said exchange releases both said cordless terminal and said wire telephone when said exchange receives a cut signal produced by an operation of said cut key.

4. A cordless telephone terminal control system according to claim 1, wherein said wire telephone includes means for detecting a contact non-contact state of said cordless terminal in correspondence with an on-hook/off-hook state;

said cordless terminal includes a detecting portion for detecting whether or not said cordless terminal is in contact with said wire telephone;

said wire telephone automatically executes calling operation which includes transmitting a call signal to said exchange when said cordless terminal assumes the non-contact state from the contact state, and then supplying said connection number of the called party to said exchange by the key operation; and said cordless terminal automatically establishes a wireless link with said cordless connecting device when said cordless terminal assumes the non-contact state from the contact state, and executes the call setting process between said cordless terminal and said exchange through said cordless connecting device.

5. A cordless telephone terminal control system according to claim 4, wherein said wire telephone further includes a calling operation key for instructing execution of the calling operation when said cordless terminal assumes the non-contact state, and if the execution of the calling operation is instructed by said calling operation key, said wire telephone executes said calling operation when said cordless terminal assumes the off-hook state.

6. A cordless telephone terminal control system according to claim 5, wherein said cordless terminal further includes a call key and transmits said connection number of the called party which is input after said call key is operated to said exchange through said cordless connecting device; and said exchange executes the call setting process between said cordless terminal and said exchange through said cordless connecting device on the basis of said connection number and establishes a channel between said cordless terminal and said telephone terminal of said called party.

7. A cordless telephone terminal control system according to claim 1, wherein said wire telephone includes means for detecting a contact/non-contact state of said cordless terminal in correspondence with an on-hook/off-hook state; and said exchange includes means for judging whether or not said cordless terminal is in contact with said wire telephone, judges whether said cordless terminal is in the on-hook state or the off-hook state when an incoming call is terminated at said wire telephone, and calls said cordless terminal through said cordless connecting device if said wire telephone is in the off-hook state, while calling said wire telephone if said wire telephone is in the on-hook state.

8. A cordless telephone terminal control system comprising:

a wire telephone including a wire interface for connecting said wire telephone to an exchange through a wire, a wireless interface for communicating with a cordless terminal on a radio wave, a man-machine interface and a control unit for controlling said wire interface, said wireless interface, and said man-machine interface;

said cordless terminal being provided in correspondence with said wire telephone and having both a function as a handset of a wire telephone and a function as a cordless terminal corresponding to a multiplicity of zones;

a cordless connecting device which transmits and receives a signal to and from said cordless terminal on a radio wave; and said exchange being connected to said wire telephone and said cordless connecting device;

said wire telephone including means for detecting whether said cordless terminal is in contact with said wire telephone, means for corresponding a contact/non-contact state of said cordless terminal to an on-hook/off-hook state, means for connecting a channel of said wire interface with a channel of said wireless interface when a wireless channel is established between said wire telephone and said cordless terminal, and means for receiving information on initiation of establishment of said wireless channel from said cordless terminal provided in correspondence with said wire telephone;

said cordless terminal including a detector for detecting whether or not said cordless terminal is in contact with said wire telephone;

wherein:

said wire telephone executes calling operation which includes transmitting a call signal to said exchange when said cordless terminal is taken from said wire telephone and then transmitting a connection number of a called party which is input by a key operation to said exchange;

said cordless terminal starts an establishment of said wireless channel with said wire telephone when said cordless terminal assumes the non-contact state from the contact state;

said wire telephone receives the information on the initiation of establishment of said wireless channel from said cordless terminal and connects said channel of said wire interface with said channel of said wireless interface; and said exchange establishes a speech channel between said cordless and the telephone terminal of the called party on the basis of said connection number.

9. A cordless telephone terminal control system according to claim 8, wherein said wire telephone further includes a speaker, a microphone, a speaker key, and means for changing the connection of said channel of said wire interface over to said speaker and said microphone, or said channel of said wireless interface by an operation of said speaker key.

10. A cordless telephone terminal control system according to claim 8, wherein said wire telephone receives a control signal produced by a key operation of said cordless terminal through a radio channel, and relays said control signal to said exchange through said wire interface.

11. A cordless telephone terminal control system according to claim 8, wherein said exchange further includes a memory for registering a relationship between said wire telephone and said cordless terminal, and means for judging whether or not said cordless terminal is in contact with said wire telephone; and the exchange further judges whether said cordless terminal is in the on-hook state or the off-hook state when an incoming call is terminated at said wire telephone and calls said cordless terminal through said cordless connecting device if said wire telephone is in the off-hook state, while calling said wire telephone if said wire telephone is in the on-hook state.

12. A cordless telephone terminal control system according to claim 8, wherein said wire telephone further includes a calling operation key for instructing execution of the calling operation when said cordless terminal assumes the noncontact state, and if the execution of the calling operation is instructed by said calling operation key, said wire telephone executes said calling operation when said cordless terminal assumes the off-hook state.

* * * * *